(12) United States Patent
Deguchi et al.

(10) Patent No.: US 10,442,873 B2
(45) Date of Patent: Oct. 15, 2019

(54) RADICAL POLYMERIZATION METHOD AND POLYMERIZATION REACTION APPARATUS

(71) Applicant: Japan Agency for Marine-Earth Science and Technology, Kanagawa (JP)

(72) Inventors: Shigeru Deguchi, Kanagawa (JP); Keigo Kinoshita, Kanagawa (JP)

(73) Assignee: Japan Agency For Marine-Earth Science and Technology (JP)

( * ) Notice: Subject to any disclaimer, the term of this patent is extended or adjusted under 35 U.S.C. 154(b) by 255 days.

(21) Appl. No.: 15/507,283

(22) PCT Filed: Aug. 24, 2015

(86) PCT No.: PCT/JP2015/073677
§ 371 (c)(1),
(2) Date: Feb. 28, 2017

(87) PCT Pub. No.: WO2016/031752
PCT Pub. Date: Mar. 3, 2016

(65) Prior Publication Data
US 2017/0291964 A1    Oct. 12, 2017

(30) Foreign Application Priority Data

Aug. 29, 2014  (JP) ................. 2014-174688

(51) Int. Cl.
*C08F 2/01* (2006.01)
*C08F 2/04* (2006.01)
(Continued)

(52) U.S. Cl.
CPC .......... *C08F 2/001* (2013.01); *B01J 19/1812* (2013.01); *B01J 19/26* (2013.01); *C08F 2/01* (2013.01);
(Continued)

(58) Field of Classification Search
CPC ...... C08F 2/01; C08F 2/04; C08F 4/04; C08F 2/001; C08F 4/34; B01J 19/1812;
(Continued)

(56) References Cited

U.S. PATENT DOCUMENTS 5,739,219 A * 4/1998 Fischer ................. B01J 19/242
526/342
8,696,952 B2   4/2014 Kumacheva et al.

FOREIGN PATENT DOCUMENTS

DE    19816886A1 A1   10/1999
EP     2570180 A1    3/2013
(Continued)

OTHER PUBLICATIONS

International Preliminary Report on Patentability and Written Opinion; dated Feb. 28, 2017 for PCT Application No. PCT/JP2015/073677.

(Continued)

*Primary Examiner* — William K Cheung
(74) *Attorney, Agent, or Firm* — Mendelsohn Dunleavy, P.C.

(57) ABSTRACT

A radical polymerization method that enables synthesis, at a high conversion rate, of polymers having a relatively uniform molecular weight and is applicable to various monomers, and an apparatus used for the method. A reaction solution containing monomer and initiator is continuously or intermittently circulated in the apparatus and is heated in a heating-initiation unit to a predetermined temperature simultaneously across a radial direction of a cross section of the flow path whereby the initiator located in a particular volume of the reaction solution is cleaved all at once. The apparatus includes a heating medium production unit 10, a heating medium-reaction solution mixing unit 20, a cooling unit 30, and a recovery unit 40 for a reaction mixture, all communicatively connected by the flow path and optionally (Continued)

a heating reaction unit 60, a cooling unit 70, and a recovery unit 80, all communicatively connected by the flow path.

22 Claims, 10 Drawing Sheets

(51) Int. Cl.

| | | |
|---|---|---|
| *B01J 19/26* | (2006.01) | |
| *C08F 4/04* | (2006.01) | |
| *C08F 4/34* | (2006.01) | |
| *C08F 4/46* | (2006.01) | |
| *F16K 17/02* | (2006.01) | |
| *C08F 2/00* | (2006.01) | |
| *B01J 19/18* | (2006.01) | |
| *B60H 1/00* | (2006.01) | |
| *G05D 23/13* | (2006.01) | |

(52) U.S. Cl.
CPC ............... *C08F 2/04* (2013.01); *C08F 4/04* (2013.01); *C08F 4/34* (2013.01); *C08F 4/46* (2013.01); *B60H 1/00885* (2013.01); *F16K 17/02* (2013.01); *G05D 23/1333* (2013.01)

(58) Field of Classification Search
CPC ...... B01J 19/26; F16K 17/02; G05D 23/1333; B60H 1/00885
USPC .......................................................... 526/88
See application file for complete search history.

(56) References Cited

FOREIGN PATENT DOCUMENTS

| | | |
|---|---|---|
| JP | H0912638 A | 1/1997 |
| JP | 2000351802 A | 12/2000 |
| JP | 2006199767 A | 8/2006 |
| JP | 2007533798 A | 11/2007 |
| JP | 2012107163 A | 6/2012 |
| JP | 2012246388 | 12/2012 |
| JP | 2014043538 A | 3/2014 |
| WO | WO2005010055 A1 | 2/2005 |
| WO | WO2005103106 A1 | 11/2005 |
| WO | WO2009133186 A1 | 11/2009 |

OTHER PUBLICATIONS

International Search Report; dated Oct. 20, 2015 for PCT Application No. PCT/JP2015/073677.
Matyjaszewski, Krzysztof. "Atom transfer radical polymerization (ATRP): current status and future perspectives." Macromolecules 45.10 (2012): 4015-4039.
Braunecker, Wade A., and Krzysztof Matyjaszewski. "Controlled/living radical polymerization: Features, developments, and perspectives." Progress in Polymer Science 32.1 (2007): 93-146.
European Search Report; dated Feb. 23, 2018 for EP 15836898.5.
Notice of Reasons for Refusal for Japanese Patent Application No. 2016-545515; dated Jun. 3, 2019.

\* cited by examiner

| FLOW RATE (mL/min) | Mn | Mw | Mw/Mn |
|---|---|---|---|
| 0.1 | 7550 | 17196 | 2.28 |
| 0.5 | 8304 | 14229 | 1.71 |
| 2 | 6605 | 12939 | 1.96 |
| 5 | 5948 | 10902 | 1.83 |
| 10 | 7174 | 11250 | 1.57 |
| 15 | 6300 | 10483 | 1.66 |
| 20 | 5774 | 10752 | 1.86 |

RADICAL POLYMERIZATION METHOD AND POLYMERIZATION REACTION APPARATUS

This application is a national stage of PCT International Application No. PCT/JP2015/073677 filed in Japan on Aug. 24, 2015, which claims priority Japanese Patent Application No. 2014-174688 filed in Japan on Aug. 29, 2014, the entire text of which is specifically incorporated herein as a disclosure.

TECHNICAL FIELD

The present invention relates to a radical polymerization method and a polymerization reaction apparatus. The present invention further relates to a method of producing, by radical polymerization, a high molecular weight polymer that has a relatively narrow molecular weight distribution.

BACKGROUND ART

The annual consumption of polymer materials has climbed to more than 260 million tons, and half of this is synthesized by radical polymerization. Radical polymerization is widely used to synthesize polymers through the polymerization of unsaturated bond-bearing small molecules (monomers), e.g., styrene, ethylene, vinyl chloride, vinyl acetate, methyl methacrylate, acrylonitrile, acrylic acid, acrylamide, vinylpyrrolidone, and tetrafluoroethylene. Radical polymerization is a chain reaction formed mainly of the following three steps: initiation, growth, and termination. The radicals generated when the initiator is cleaved by, e.g., heat or light, attack the unsaturated bond-bearing monomer. The resulting monomer radical sequentially attacks additional monomer, resulting in growth of the polymer chain, and termination ultimately occurs through the recombination or disproportionation of radicals with each other or through chain transfer by a radical.

Non Patent Literature

[NPL 1] Macromolecules 2012, 45, 4015-4039
[NPL 2] Prog. Polym. Sci. 32 (2007) 93-146

The entire text of NPL 1 and NPL 2 is specifically incorporated herein as a disclosure.

SUMMARY OF INVENTION

Technical Problem

In an ideal radical polymerization, a polymer of uniform length is synthesized in a short reaction time at a high conversion. However, a particularly prominent problem with ordinary radical polymerizations was that the length of the resulting polymer assumed a particularly large distribution. To date, living radical polymerization has been developed as a method for synthesizing polymer of uniform length by radical polymerization, and various methods with different reaction mechanisms, e.g., atom transfer radical polymerization (ATRP) and reversible addition-fragmentation chain-transfer polymerization (RAFT), have been investigated (NPL 1 and NPL 2). However, one problem with ATRP is its high cost due to the use of a transition metal catalyst, while another problem is its long reaction time. A problem with RAFT is that it requires an expensive chain transfer agent and thus has high costs. With both methods, a detailed design of a suitable catalyst is necessitated by changes in, e.g., the monomer species or reaction temperature, and a catalyst universally applicable regardless of the reaction system does not exist.

Separately from living radical polymerization, pulsed laser initiated polymerization (PLP), in which the reaction is controlled through intermittent exposure to laser light, has been developed as a method for the synthesis of polymer of uniform length. However, PLP is a procedure used for the analysis of reaction rates, and it is carried out on a small reaction scale of only about several milliliters in order to achieve uniform irradiation with the laser and is thus unsuitable as an industrial production method.

An object of the present invention is to provide a radical polymerization method that can synthesize, in a short reaction time and at high conversions, polymer having a relatively uniform molecular weight and that can use various monomers in general use. A further object of the present invention is to provide an apparatus that uses this method.

Solution to Problem

The present inventors discovered that radical polymerization can be initiated by heating a mixed solution of an initiator and monomer instantaneously under pressurization to a high temperature that is equal to or greater than the boiling point of the solvent, thereby causing the initiator present in the reaction solution to undergo cleavage all at once. Moreover, it was discovered that, by carrying out this radical polymerization in a flowthrough reaction apparatus, a polymer having a relatively narrow molecular weight distribution can be readily synthesized in a short period of time without using an expensive catalyst. The present invention was achieved based on these discoveries.

The present invention is as follows.

[1]

A method of producing a polymer by causing a reaction solution containing a monomer and a radical polymerization initiator to continuously or intermittently flow through a flow path of a radical polymerization reaction apparatus, the method including:

(1) a step of flowing the reaction solution into a heating-initiation part of the reaction apparatus and heating the flowed reaction solution to a prescribed temperature to cause the radical polymerization initiator in the reaction solution that has flowed into the heating-initiation part to undergo cleavage and thereby initiate radical polymerization of the monomer;

(2) a step of advancing the radical polymerization of the monomer in the reaction solution; and (3) a step of cooling the reaction solution and obtaining the polymer, wherein the heating of the reaction solution, which has flowed into the heating-initiation part, at the prescribed temperature in step (1) provides a condition where the radical polymerization initiator present in a timewise sliced volume of the reaction solution that has flowed into the heating-initiation part undergoes cleavage all at once.

[2]

The method according to [1], wherein the all-at-once cleavage of the radical polymerization initiator present in the unit volume is brought about by heating the radical polymerization initiator present in this volume to the prescribed temperature simultaneously across the radial direction of a cross section of the flow path.

[3]

The method according to [2], wherein the heating of the reaction solution to the prescribed temperature is carried out by continuously mixing, under pressurization, the reaction solution with a heating medium in the heating-initiation part.

[4]

The method according to [3], wherein the reaction solution contains water; the heating medium is water heated to at least 150° C.; and the reaction solution and the heating medium are continuously mixed at a flow rate ratio that provides a temperature of at least 100° C. immediately after mixing.

[5]

The method according to [3], wherein the reaction solution contains an organic solvent; the heating medium is an organic solvent heated to at least a boiling point thereof; and the reaction solution and heating medium are continuously mixed at a flow rate ratio that provides a temperature that is at least the boiling point of the organic solvent immediately after mixing.

[6]

The method according to [2], wherein the heating of the reaction solution to the prescribed temperature is carried out by flowing the reaction solution containing the monomer and the radical polymerization initiator into a flow path of a heating-initiation part that is being controlled to maintain the prescribed temperature, of a heating apparatus within the radical polymerization reaction apparatus.

[7]

The method according to [6], wherein the throughflow of the reaction solution is carried out at a flow rate of at least 0.1 mL/minute within a flow path made of a thermally conductive material and having an inner diameter of not more than 10 mm.

[8]

The method according to any one of [1] to [7], wherein the heating is carried out under a condition where cleavage of the radical polymerization initiator present in the unit volume of the reaction solution is completed within 1 second.

[9]

The method according to any one of [1] to [8], wherein the prescribed heating temperature is in the range of T+50° C. to T+150° C. where T° C. is an initiation temperature of the radical polymerization initiator.

[10]

The method according to any one of [1] to [9], wherein the polymer has a weight-average molecular weight (Mw)/number-average molecular weight (Mn) of not more than 3.0.

[11]

The method according to any one of [1] to [9], wherein the polymer has a weight-average molecular weight (Mw)/number-average molecular weight (Mn) of not more than 2.0.

[12]

A radical polymerization reaction apparatus including: a heating medium production part 10; a heating medium-reaction solution mixing part 20; a cooling part 30; and a reaction mixture recovery part 40, these being connected by flow paths.

[13]

The apparatus according to [12], wherein (1) the heating medium production part 10 includes a heating medium starting material storage part 11 and a heating medium heating part 12;

(2) the heating medium-reaction solution mixing part 20 includes a reaction solution storage and feed part 21, a mixing-reaction part 22, and a reaction residence part 23; and (3) the cooling part 30 includes a cooling medium storage and feed part 31, a coolant-reaction mixture mixing part 32, and a cooling residence part 33.

[14]

The apparatus according to [13], wherein, in the heating medium production part 10, the heating medium starting material storage part 11 has a function to store a heating medium starting material and feed the heating medium starting material to the heating medium heating part 12, and the heating medium heating part 12 includes a flow path through which the heating medium starting material flows, and a heating apparatus that heats this flow path.

[15]

The apparatus according to [13] or [14], wherein, in the heating medium-reaction solution mixing part 20, the reaction solution storage and feed part 21 has a function to store the reaction solution and feed the reaction solution to the mixing-reaction part 22, and the mixing-reaction part 22 has a function to merge and mix a heating medium flow fed via a flow path from the heating medium heating part 12, with a reaction solution flow fed via a flow path from the reaction solution storage and feed part 21, and has a structure in which a flow path forms three branches.

[16]

The apparatus according to any one of [13] to [15], wherein, in the cooling part 30, the cooling medium storage and feed part 31 has a function to store the cooling medium and feed the cooling medium to the cooling medium-reaction mixture mixing part 32, the cooling medium-reaction mixture mixing part 32 has a function to merge and mix a reaction mixture flow fed via a flow path from the reaction residence part 23, with a cooling medium flow fed via a flow path from the cooling medium storage and feed part 31, and the cooling residence part 33 has a temperature hold or cooling function.

[17]

A radical polymerization reaction apparatus that includes: a heating-reaction part 60 for heating the reaction solution and causing the reaction solution to undergo a polymerization reaction; a cooling part 70 that cools the reaction solution after heating and reaction; and a reaction mixture recovery part 80, these being connected by flow paths.

[18]

The apparatus according to [17], wherein (1) the heating-reaction part 60 includes a flow path 61 through which the reaction solution flows, and a heating part 62 for heating this flow path, and (2) the cooling part 70 includes a flow path 71 through which the reaction solution flows, and a cooling part 72 for cooling this flow path.

Advantageous Effects of the Invention

A high molecular weight polymer having a relatively narrow molecular weight distribution can be easily synthesized according to the present invention in a relatively short reaction time without using an expensive catalyst. The method of the present invention is also characterized in that it can be applied to any radical polymerization reaction and also has a high versatility or the like.

BRIEF DESCRIPTION OF DRAWINGS

FIG. 1-2 shows the flow rate and temperature conditions in Example 1.

FIG. 2 shows a partial cross-sectional diagram of the triple branch region for the flow paths A, B, and C of the polymerization apparatus A.

FIG. 8-1 shows a schematic diagram of one embodiment (polymerization apparatus B) of the radical polymerization reaction apparatus of the present invention.

FIG. 8-2 shows a schematic cross-sectional descriptive diagram of a heating-reaction part apparatus 600 of the polymerization apparatus B.

DESCRIPTION OF EMBODIMENTS

<Polymer Production Method>

Figure 1:
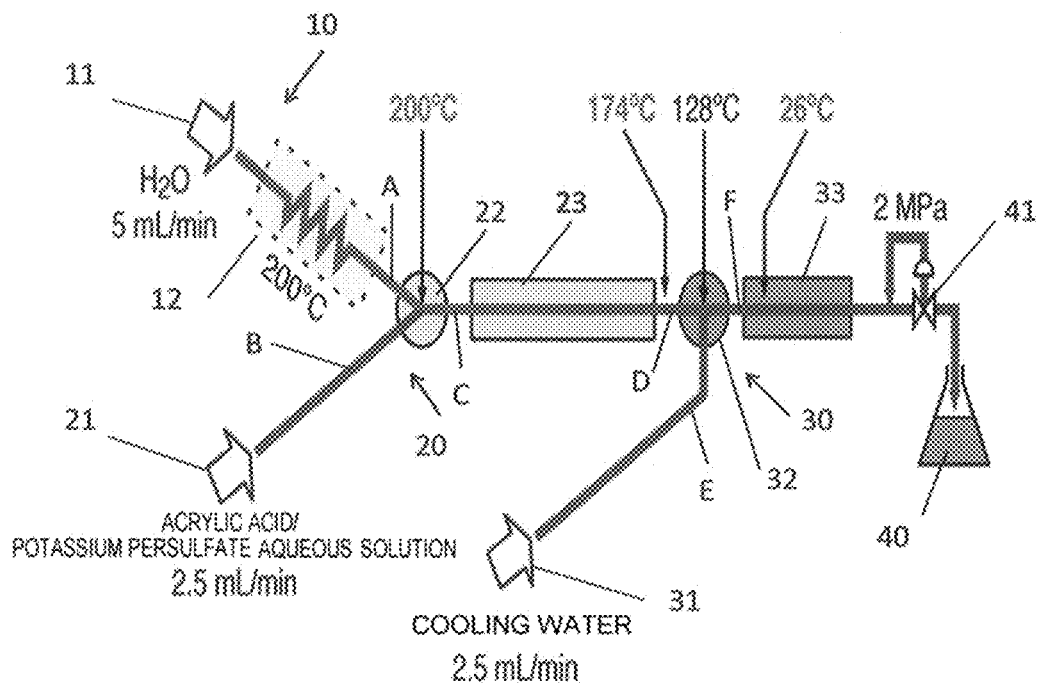
FIG. 1-1 shows a schematic diagram of one embodiment (polymerization apparatus A) of the radical polymerization reaction apparatus of the present invention, wherein the flow rate and temperature shown in the diagram are the flow rate and temperature in Example 1.

The present invention relates to a polymer production method in which a reaction solution containing monomer and a radical polymerization initiator is caused to flow continuously or intermittently in a flow path of a radical polymerization reaction apparatus. This method includes the following steps (1) to (3):

(1) a step of flowing the reaction solution into a heating-initiation part of the reaction apparatus and heating the flowed reaction solution to a prescribed temperature to cause the radical polymerization initiator in the reaction solution that has flowed into the heating-initiation part to undergo cleavage and thereby initiate radical polymerization of the monomer;

(2) a step of advancing the radical polymerization of the monomer in the reaction solution; and (3) a step of cooling the reaction solution and obtaining the polymer.

The heating of the reaction solution, which has flowed into the heating-initiation part, at the prescribed temperature in step (1) provides a condition where the radical polymerization initiator present in a timewise sliced volume of the reaction solution that has flowed into the heating-initiation part undergoes cleavage all at once. The all-at-once cleavage of the radical polymerization initiator present in this unit volume is brought about by heating the radical polymerization initiator present in this volume to the prescribed temperature simultaneously across the radial direction of a cross section of the flow path. In other words, this means that the heating of the reaction solution across the radial direction of the cross section of the flow path is carried out with there being almost no time difference between the central part and the neighborhood of the outer circumference part.

The timewise sliced volume of the reaction solution that has flowed into the heating-initiation part denotes a volume, calculated from the cross-sectional area of the flow path and the length in the flow direction, for which the heating conditions can be approximated as equivalent, wherein the length in the flow direction that corresponds to the volume where the heating conditions can be approximated as equivalent varies depending on the flow rate of the reaction solution. At faster flow rates, and assuming a constant cross-sectional area for the flow path, the volume where the heating conditions can be approximated as equivalent is larger; at slower flow rates, and assuming a constant cross-sectional area for the flow path, the volume where the heating conditions can be approximated as equivalent is smaller. For example, in the case of the apparatus used in the examples, the diameter of the flow path is approximately 0.8 mm and the cross-sectional area is thus approximately 0.5 mm$^2$, and the volume for a 1 mm length in the flow direction is then approximately 0.5 mm$^3$. Thus, the condition of the radical polymerization initiator present in a timewise sliced volume of approximately 0.5 mm$^3$ undergoing cleavage all at once is then a condition where all-at-once cleavage is performed by simultaneously heating to the prescribed temperature over the radial (approximately 0.4 mm) direction of the cross section of the flow path.

The heating of the reaction solution to the prescribed temperature, that enables the occurrence of all-at-once cleavage of the radical polymerization initiator present in this unit volume can be carried out by, for example, continuous mixing of the reaction solution under pressurization with a heating medium in a heating-initiation part of the radical polymerization reaction apparatus (method A). Or, the heating of the reaction solution to the prescribed temperature can be carried out by introducing the reaction solution containing the monomer and the radical polymerization initiator into a flow path of a heating-initiation part that is being controlled to maintain the prescribed temperature, of a heating apparatus within the radical polymerization reaction apparatus (method B). Radical polymerization reaction apparatuses that can be used for these methods A and B are described in the following.

<Radical Polymerization Reaction Apparatus>

Figures 1, 8:
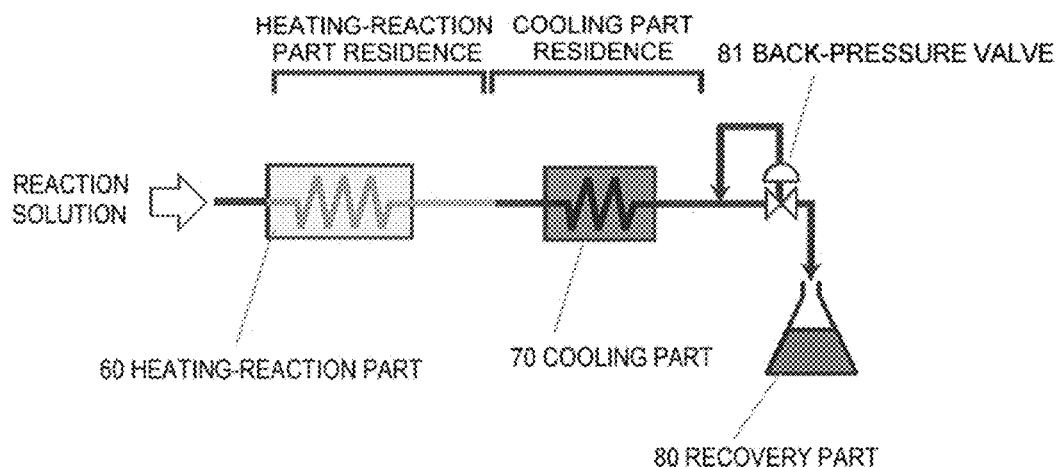
Figures 2, 8:
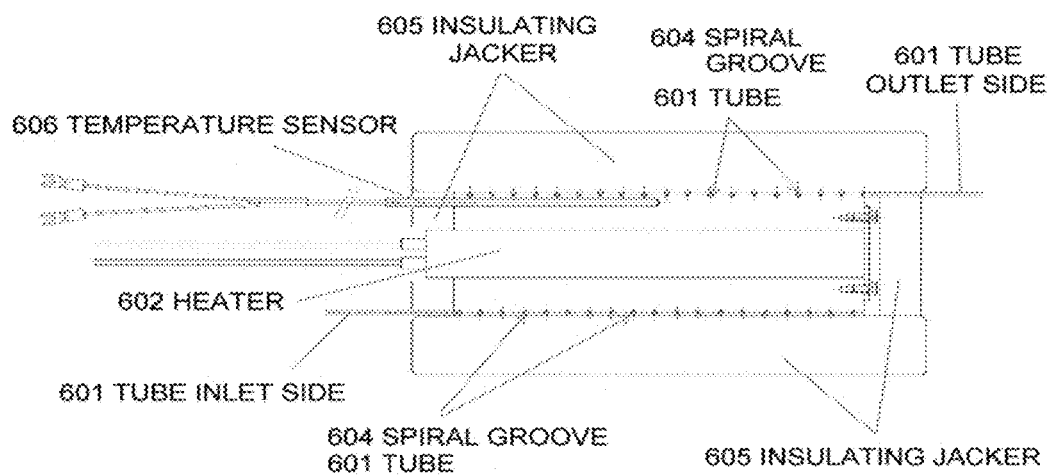

The radical polymerization reaction apparatus of the present invention is not particularly limited as to its form or configuration. A flowthrough apparatus is used for the radical polymerization reaction of the present invention in order to bring about the completion of the reaction in a short period of time using instantaneous heating to a high temperature. Schematic diagrams of examples of the polymerization reaction apparatus of the present invention are given in FIGS. 1 and 8. The polymerization apparatus A given in FIG. 1 is an apparatus that can be used in method A, supra, and includes a heating medium production part 10, a heating medium-reaction solution mixing part 20, a cooling part 30, and a reaction mixture recovery part 40, these being connected by flow paths. The polymerization apparatus B shown in FIG. 8 is an apparatus that can be used in method B, supra, and is a radical polymerization reaction apparatus that includes a heating-reaction part 60 for heating the reaction solution and bringing about the polymerization reaction, a cooling part 70 that cools the reaction solution after heating and reaction, and a reaction mixture recovery part 80, these being connected by flow paths. The polymerization apparatus B is an apparatus having a simple structure that does not use a heating medium and that feeds the reaction solution containing monomer and initiator to a heating part that has been preheated to the reaction temperature.

<Radical Polymerization Reaction Apparatus A>

The heating medium production part 10 includes a heating medium starting material storage part 11 and a heating medium heating part 12.

The heating medium starting material storage part 11 has a function to store the heating medium starting material and feed the heating medium starting material to the heating medium heating part 12. The feed of the heating medium starting material can be carried out using, for example, a plunger pump, diaphragm pump and syringe pump. The heating medium heating part 12 includes a flow path through which the heating medium starting material flows, and a heating apparatus that heats this flow path. The heating apparatus can be selected as appropriate also considering the type of heating medium starting material and can be an induction heating coil when the heating medium starting material is water. The heating means is not particularly limited and, for example, an electric heater, water bath, oil bath, molten salt, Peltier element and microwaves can be selected and used as appropriate. The heating medium heating part 12 communicates with the mixing-reaction part 22.

The heating medium-reaction solution mixing part 20 includes a reaction solution storage and feed part 21, a mixing-reaction part 22, and a reaction residence part 23. The mixing-reaction part 22 corresponds to the heating-initiation part in method A. The reaction solution storage and feed part 21 has a function to store the reaction solution and feed the reaction solution to the mixing-reaction part 22. The feed of the reaction solution can be carried out using, for example, a plunger pump, diaphragm pump and syringe pump. The mixing-reaction part 22 has a function to merge and mix the heating medium flow fed via the flow path from the heating medium heating part 12, with a reaction solution flow fed via the flow path from the reaction solution storage and feed part 21. The mixing-reaction part 22 favorably has a structure in which the flow path forms three branches, wherein the first is a flow path (flow path A) from the heating medium heating part 12, the second is a flow path (flow path B) from the reaction solution storage and feed part 21, and the third is a flow path (flow path C) to the reaction residence part 23. The inner diameter and cross-sectional area of each of the flow paths may be equal to the others or may differ from the others; for example, the total of the cross-sectional areas of flow path A and flow path B may be equal to the cross-sectional area of flow path C.

Figures 1, 2:
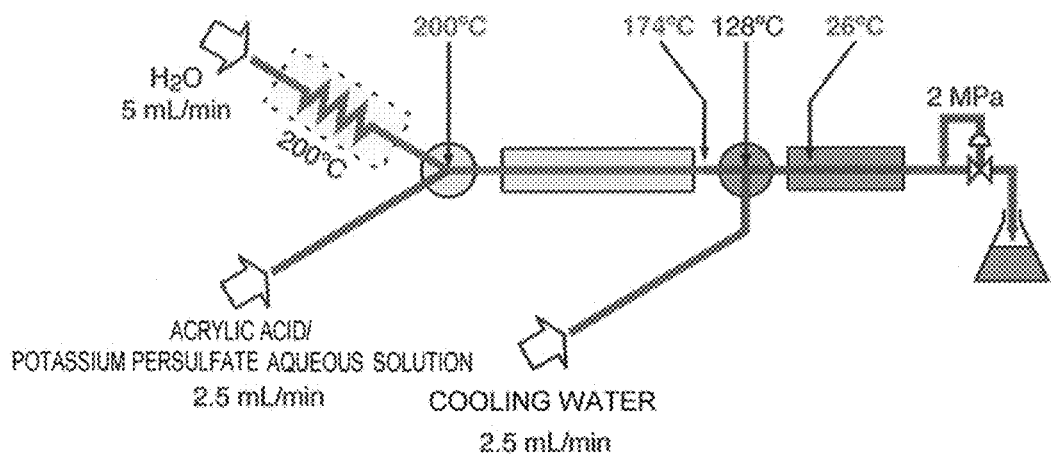
Figure 2:
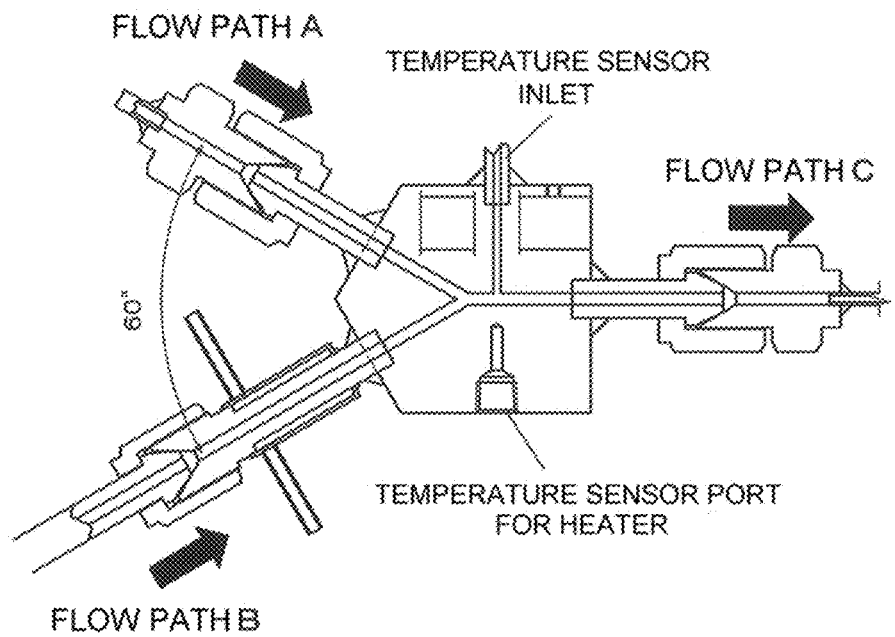

The angle made by each of the flow paths constituting the triple branch of the mixing-reaction part 22 is not particularly limited and can be established as appropriate considering, for example, the mixed state produced due to the confluence of the reaction solution and heating medium. For example, this can be a structure in which flow paths A and C communicate linearly while flow path B merges thereinto at an angle in the range of at least 10° and not more than 170° and preferably at an angle in the range of 30° to 150°. Likewise, this can be a structure in which flow paths B and C communicate linearly while flow path A merges thereinto at an angle in the range of at least 10° and not more than 170° and preferably at an angle in the range of 30° to 150°. Or, flow paths A to C may have a Y-shaped merge structure, wherein the angle between flow path A and flow path B, the angle between flow path B and flow path C, and the angle between flow path C and flow path A can each independently be an angle in the range of at least 10° and not more than 180° and preferably in the range from 30° to 160° and more preferably an angle in the range from 60° to 150°. FIG. 2 gives a diagram of the triple branch region of an apparatus used in the examples. In this apparatus, the angle between flow path A and flow path B is approximately 60°; the angle between flow path B and flow path C is approximately 150°; and the angle between flow path C and flow path A is approximately 150°. By using a mixing-reaction part 22 having such a structure and feeding the heating medium flow and reaction solution flow to this and thereby merging them, the two are mixed and the temperature of the reaction solution is raised to the prescribed reaction temperature in a short period of time. The time required to raise the temperature to the prescribed reaction temperature will also vary depending on the flow rates of the heating medium flow and the reaction solution flow and the structure of the mixing-reaction part 22, but, for example, is within 0.01 to 5 seconds and preferably within 0.01 to 1 second. Shorter times here provide a more uniform molecular weight for the polymer yielded by the polymerization.

In the method of the present invention, the heating of the reaction solution, which has flowed into the heating-initiation part, at the prescribed temperature provides a condition where the radical polymerization initiator present in a timewise sliced volume of the reaction solution that has flowed into the heating-initiation part undergoes cleavage all at once. This all-at-once cleavage of the radical polymerization initiator present in this unit volume is brought about by heating the radical polymerization initiator in this volume to the prescribed temperature simultaneously across the radial direction of the cross section of the flow path. In the case of use of the above-described polymerization apparatus A, a mixed state is produced by merging the reaction solution and the heating medium in the mixing-reaction part 22, which corresponds to the heating-initiation part. As a result, the heating of the reaction solution across the radial direction of the cross section of the flow path is carried out with there being almost no time difference between the central part and the neighborhood of the outer circumference part.

A temperature sensor inlet and a temperature sensor port for the heater are shown in the mixing-reaction part 22 shown in FIG. 2. These can be advantageously used for temperature control.

The mixing-reaction part 22 communicates with the reaction residence part 23 through the flow path C. This reaction residence part 23 preferably has a temperature hold function and can also have a heating function. The residence time in the reaction residence part 23 will vary depending on the volume of the flow path in the reaction residence part 23 and the flow rates of the heating medium flow and the reaction solution flow, but, for example, can be in the range of 1 second to 10 minutes or in the range of 1 to 120 seconds, the range of 1 to 100 seconds, the range of 1 to 60 seconds, the range of 1 to 30 seconds, the range of 1 to 20 seconds, or the range of 1 to 10 seconds.

The cooling part 30 includes a cooling medium storage and feed part 31, a coolant-reaction mixture mixing part 32, and a cooling residence part 33. The cooling medium storage and feed part 31 has a function to store the cooling medium and feed the cooling medium to the cooling medium-reaction mixture mixing part 32. The feed of the cooling medium can be carried out using, for example, a plunger pump, diaphragm pump and syringe pump. The cooling medium-reaction mixture mixing part 32 has a function to merge and mix the reaction mixture flow fed via the flow path from the reaction residence part 23, with the cooling medium flow fed via the flow path from the cooling medium storage and feed part 31. The mixing part 32 favorably has a structure in which the flow path forms three branches, wherein the first is a flow path (flow path D) from the reaction residence part 23, the second is a flow path (flow path E) from the cooling medium storage and feed part 31, and the third is a flow path (flow path F) to the cooling residence part 33. The inner diameter and cross-sectional area of each of the flow paths may be equal to the others or may differ from the others; for example, the total of the cross-sectional areas of flow path D and flow path E may be equal to the cross-sectional area of flow path F.

Figure 3:
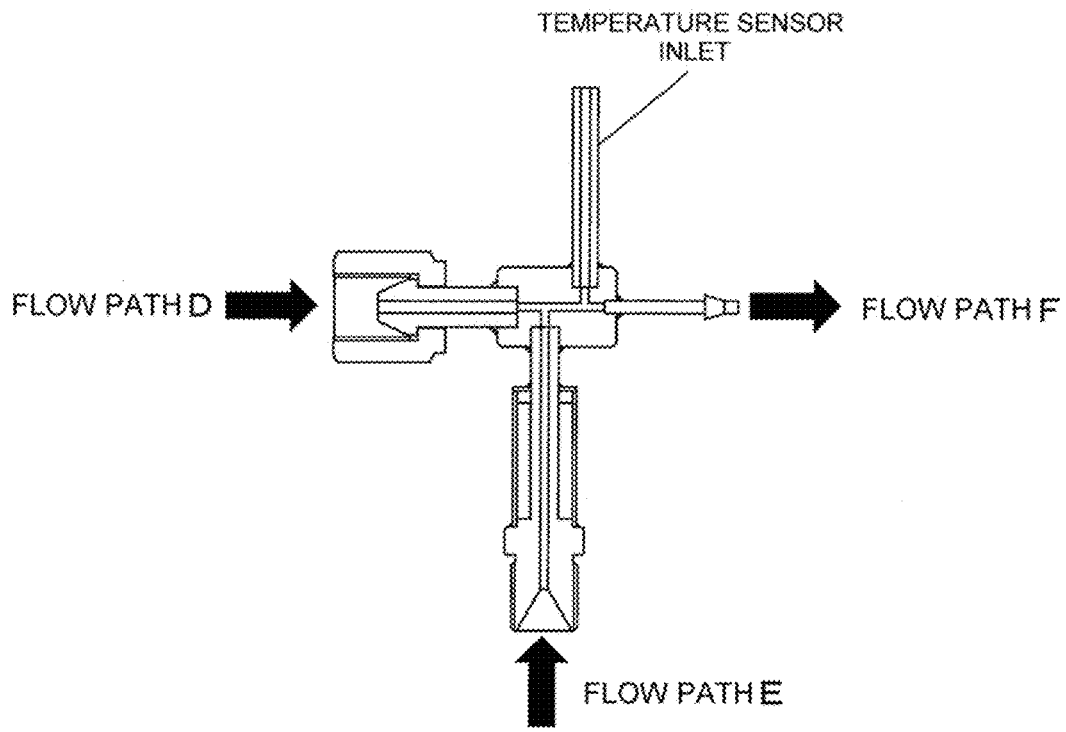
FIG. 3 shows a partial cross-sectional diagram of the triple branch region for the flow paths D, E, and F of the polymerization apparatus A.

The angle made by each of the flow paths constituting the triple branch of the cooling medium-reaction mixture mixing part 32 is not particularly limited and can be established as appropriate considering, for example, the mixing state due to the confluence of the reaction mixture and cooling medium. For example, this can be a structure in which flow paths D and F communicate linearly while flow path E merges thereinto at an angle in the range of at least 10° and not more than 170° and preferably at an angle in the range from 30° to 150°. Likewise, this can be a structure in which flow paths E and F communicate linearly while flow path D merges thereinto at an angle in the range of at least 10° and not more than 170° and preferably at an angle in the range from 30° to 150°. Or, flow paths D to F may have a Y-shaped merge structure, wherein the angle between flow path D and flow path E, the angle between flow path E and flow path F, and the angle between flow path F and flow path D can each independently be an angle in the range of at least 10° and not more than 180°, preferably an angle in the range from 30° to 160°, and more preferably an angle in the range from 60° to 150°. FIG. 3 gives a diagram of the triple branch region of an apparatus used in the examples. In this apparatus, the angle between flow path D and flow path F is approximately 90°; the angle between flow path E and flow path F is approximately 90°; and the angle between flow path F and flow path D is approximately 180°. The mixing part 32 communicates with the cooling residence part 33 via the flow path F. The cooling residence part 33 preferably has a temperature hold function and can also have a cooling function. The cooling means is not particularly limited, and, for example, water cooling, air cooling and a Peltier element can be suitably selected and used. The temperature sensor inlet shown in the cooling medium-reaction mixture mixing part 32 shown in FIG. 3 can be used as appropriate for temperature control.

The heating medium production part 10, heating medium-reaction solution mixing part 20, and cooling part 30 are connected by flow paths. The cross-sectional shape and dimensions of each flow path can be established as appropriate. The cross-sectional shape of each flow path can be circular or elliptical or can be a polygonal shape (the number of angles can be, for example, between 3 and 20, but this does not imply a limitation thereto). It can also be a composite shape of circular (including elliptical) and polygonal. The cross-sectional dimensions of each flow path can be, for example, assuming the cross-sectional shape is circular, an inner diameter in the range from 0.1 mm to 100 mm and preferably in the range from 0.1 to 10 mm. For the case of other shapes, this can be suitably established based on the circular case.

The outlet flow path from the cooling residence part 33 communicates with a reaction mixture recovery part 40. A pressure reduction valve 41 can also be disposed as appropriate between the cooling residence part 33 and the reaction mixture recovery part 40.

<Radical Polymerization Reaction Apparatus B>

The polymerization apparatus B is a radical polymerization reaction apparatus that includes a heating-reaction part 60 for heating the reaction solution and thereby bringing about the polymerization reaction, a cooling part 70 that cools the reaction solution after the heating and reaction, and a reaction mixture recovery part 80, these being connected by flow paths. The polymerization apparatus B is an apparatus with a simple structure that does not use a heating medium and that feeds the reaction solution containing monomer and initiator to a heating part that has been preheated to the reaction temperature.

(1) The heating-reaction part 60 includes a flow path 61 through which the reaction solution flows, and a heating part 62 for heating this flow path.

The feed of the reaction solution can be carried out using, for example, a plunger pump, diaphragm pump and syringe pump. The heating part 62 can be selected as appropriate also considering the type of reaction solution and can be an induction heating coil when the reaction solution contains water. The heating means is not particularly limited and, for example, an electric heater, water bath, oil bath, molten salt, Peltier element and microwaves can be selected and used as appropriate. The heating-reaction part 60 can incorporate a temperature sensor (not shown) for the purpose of measuring the temperature of the flow path 61 and controlling the heating at the heating part 62.

Step (1) and step (2) are carried out at the heating-reaction part 60. The residence time at the heating-reaction part 60 will vary depending on the volume of the flow path at the heating-reaction part 60 and the flow rate of the reaction solution flow. In addition, the heating temperature and residence time at the heating-reaction part 60 can be established as appropriate in correspondence to the composition of the reaction solution (monomer type and concentration, type and concentration of the radical polymerization initiator) and in correspondence to the weight-average molecular weight (Mw)/number-average molecular weight (Mn) desired for the polymer and the conversion of the monomer to polymer. The heating temperature at the heating-reaction part 60, for example, is in the range of 150° C. to 250° C. and the residence time can be, for example, in the range of 1 second to 10 minutes or can be in the range of 1 to 240 seconds, in the range of 1 to 120 seconds, in the range of 1 to 100 seconds, in the range of 2 to 80 seconds, in the range of 3 to 60 seconds, or in the range of 4 to 50 seconds.

The heating-reaction part of this polymerization apparatus B can be the apparatus shown in FIG. 8-2. In this heating-reaction part apparatus 600, a ¹⁄₁₆-inch tube 601 of stainless steel (SUS316, inner diameter of approximately 0.8 mm) is laid in a spiral groove 604 that is itself disposed in the outer circumferential surface of a cylindrical copper heat conductor 603 that in its center is fitted in intimate contact on a cylindrical heater 602; the tube 601 is spirally wound so as to be in intimate contact with the heat conductor; and an insulating jacket 605 is present at both ends and on the outer circumference of the wound tube 601. In addition, a temperature sensor 606 is present in the vicinity of the location of the spirally disposed tube at the cylindrical copper heat conductor.

In the method of the present invention, the heating of the reaction solution, which has flowed into the heating-initiation part, at the prescribed temperature provides a condition where the radical polymerization initiator present in a timewise sliced volume of the reaction solution that has flowed into the heating-initiation part undergoes cleavage all at once. This all-at-once cleavage of the radical polymerization initiator present in this unit volume is brought about by heating the radical polymerization initiator present in this volume to the prescribed temperature simultaneously across the radial direction of the cross section of the flow path. In the case of use of the polymerization apparatus B, the reaction solution is instantaneously heated in the vicinity of the inlet to the heating-reaction part of the tube 601, which corresponds to the heating-initiation part; in addition, the diameter of the tube 601 is approximately 0.8 mm. As a result, heating of the reaction solution across the radial direction of the cross section of the flow path is carried out with there being almost no time difference between the central part and the neighborhood of the outer circumference part.

(2) The cooling part 70 includes a flow path 71 for the throughflow of the reaction solution and a cooling part 72 for cooling this flow path.

The cooling part 72 has a cooling means; this cooling means is not particularly limited and, for example, water cooling, air cooling and a Peltier element can be selected and used as appropriate. The cooling part 70 can incorporate a temperature sensor for the purpose of measuring the temperature of the flow path 71 and controlling the cooling of the cooling part 72.

The heating-reaction part 60 and the cooling part 70 are connected by a flow path. The cross-sectional shape and dimensions of each flow path can be established as appropriate. The cross-sectional shape of each flow path can be circular or elliptical or can be a polygonal shape (the number of angles can be, for example, between 3 and 20, but this does not imply a limitation thereto). It can also be a composite shape of circular (including elliptical) and polygonal. The cross-sectional dimensions of each flow path can be, for example, assuming the cross-sectional shape is circular, an inner diameter in the range from 0.1 mm to 20 mm, preferably in the range from 0.1 to 10 mm, more preferably in the range from 0.1 to 5 mm, even more preferably in the range from 0.1 to 3 mm, still more preferably in the range from 0.1 to 2 mm, and still more preferably in the range from 0.1 to 1 mm. A smaller cross-sectional dimension for the flow path is preferred because heat conduction to the reaction solution in the flow path from the heater outside the flow path then occurs more rapidly and cleavage of the polymerization initiator in the reaction solution is thereby produced all at once. For the case of other shapes, this can be suitably established based on the circular case.

The outlet flow path from the cooling part 70 communicates with the reaction mixture recovery part 80. A pressure reduction valve 81 can also be disposed as appropriate between the cooling part 70 and the reaction mixture recovery part 80.

<Polymerization Method>

The polymerization method of the present invention is a method that brings about the radical polymerization of monomer by heating a reaction solution that contains the monomer and a radical polymerization initiator, wherein this heating is carried out under the condition where the radical polymerization initiator present in the reaction solution undergoes cleavage all at once.

Existing substances can be used as such for the monomer and radical polymerization initiator. The details are described in the following.

<Polymerization Procedure>

The heating of the reaction solution, which has flowed into the heating-initiation part, at the prescribed temperature for the polymerization procedure provides a condition where the radical polymerization initiator present in a timewise sliced volume of the reaction solution that has flowed into the heating-initiation part undergoes cleavage all at once. This all-at-once cleavage of the radical polymerization initiator present in this unit volume is brought about by heating the radical polymerization initiator present in this volume to the prescribed temperature simultaneously across the radial direction of a cross section of the flow path.

In the case of use of the radical polymerization apparatus A of the present invention, see above, prior to starting the procedure the heating medium starting material is prepared at the storage and feed part 11, the reaction solution (contains at least monomer and polymerization initiator and preferably also contains solvent) is prepared at the storage and feed part 21, and the cooling medium is prepared at the storage and feed part 31. Once these materials have been prepared, the heating medium heating part 12 is brought to a prescribed temperature and the heating medium starting material, reaction solution, and cooling medium are fed into each flow path using a pump that is provided in the respective flow path. As has been described above, the reaction solution flow is mixed in a short period of time in the mixing-reaction part 22 with the heating medium flow that has been heated to the prescribed temperature. In the mixing-reaction part 22, which corresponds to the heating-initiation part, a mixed state is produced by merging the reaction solution and the heating medium and as a result the heating of the reaction solution across the radial direction of the cross section of the flow path is carried out with there being almost no time difference between the central part and the neighborhood of the outer circumference part. Furthermore, via the flow path C, heating to the prescribed temperature is maintained in the reaction residence part 23. The residence time at the reaction residence part 23 will vary depending on the volume of the flow path in the reaction residence part 23 and the flow rates of the heating medium flow and the reaction solution flow, but, for example, can be in the range of 1 second to 10 minutes or in the range of 1 to 120 seconds, the range of 1 to 100 seconds, the range of 1 to 60 seconds, the range of 1 to 30 seconds, the range of 1 to 20 seconds, or the range of 1 to 10 seconds. Due to this rapid mixing and the residence in the reaction residence part 23, the radical polymerization initiator present in the reaction solution undergoes cleavage all at once and the polymerization reaction is completed within a relatively short period of time that also depends on the flow rate. However, it is preferred that the radical polymerization initiator undergo all-at-once cleavage and the polymerization reaction be completed within the residence time in the reaction residence part 23, wherein, for example, completion within 10 seconds and preferably completion within 5 seconds, or within 4 seconds, or within 3 seconds, or within 2 seconds, more preferably within 1 second, and most preferably within 0.5 second is a suitable condition for cleavage of the radical polymerization initiator. Due, in the present invention, to the heating of the reaction solution so that the radical polymerization initiator present in the reaction solution undergoes cleavage all at once, the radical polymerization reaction goes forward in unison; almost the entire amount of the monomer in the reaction solution is consumed by the polymerization reaction within a short period of time; and as a result the polymerization reaction is completed in a short period of time due to the almost complete consumption of the monomer. By suitably setting the reaction temperature, the polymerization reaction can be brought to completion during transit of the reaction residence part 23. After passing through the reaction residence part 23, the reaction mixture flow is merged, mixed, and cooled in the cooling medium-reaction mixture mixing part 32 with a cooling medium flow fed from the cooling medium storage and feed part 31 and the polymerization reaction mixture can then be removed. The purpose of cooling in the cooling medium-reaction mixture mixing part 32 is to bring the polymerization reaction mixture to the temperature for its removal, and a method other than merging and mixing with a cooling medium flow can also be adopted for cooling.

The flow rates of the reaction solution and heating medium fed to the reaction residence part 23 and the flow rate ratio between these two materials are established as appropriate considering, for example, the design and scale of the polymerization apparatus, the heat medium starting material, the type of reaction solution, the type of cooling medium, the desired polymerization product, and the set temperature at the heating medium heating part 12. The design and scale of the polymerization apparatus refer, for example, to the dimensions and intersection configuration of each flow path in the reaction solution storage and feed part 21, the dimensions and intersection configuration of each flow path in the coolant-reaction mixture mixing part 32, the cross-sectional area of each flow path, and the length of each flow path.

With the polymerization apparatus and polymerization procedure of the present invention, for example, the cross-sectional areas of the flow paths in the mixing-reaction part 22 and the intersection configuration for the three flow paths A, B, and C, the flow rates and ratios for the heating medium starting material and reaction solution fed to this mixing-reaction part 22, and the temperature and particularly the temperature immediately after mixing, can exercise an effect on the molecular weight distribution of the polymer. The magnitude of this effect will vary depending on, for example, the species of the monomer and initiator, and can be adjusted as appropriate.

The heating for the polymerization procedure is carried out under the condition where the radical polymerization initiator present in the reaction solution undergoes cleavage all at once. In the case of use of the radical polymerization apparatus B of the present invention as described above, the reaction solution (contains at least the monomer and polymerization initiator and preferably also contains a solvent) is prepared prior to the start of the procedure. Once preparation has been carried out, the heating-reaction part 60 is established at the prescribed temperature and feed into each flow path is carried out using a reaction solution pump. In addition, the cooling part 70 is preliminarily cooled according to prescribed conditions. The reaction solution flow is heated to a prescribed temperature in the heating-reaction part 60 and is held at this temperature. The residence time in the heating-reaction part 60 will vary with the volume of the flow path in the heating-reaction part 60 and the flow rates of the heating medium flow and reaction solution flow, but, for example, can be in the range from 1 second to 10 minutes or can be in the range from 1 to 240 seconds, the range of 1 to 120 seconds, the range of 1 to 100 seconds, the range of 2 to 80 seconds, the range of 3 to 60 seconds, or the range of 4 to 50 seconds. Due to the rapid heating at the heating-reaction part 60, the radical polymerization initiator present in the reaction solution undergoes cleavage all at once, and the polymerization reaction advances during the following residence.

It is preferred that the radical polymerization initiator undergo all-at-once cleavage and the polymerization reaction be completed within the residence time in the heating-reaction part 60, wherein, for example, completion within 10 seconds and preferably completion within 5 seconds, or within 4 seconds, or within 3 seconds, or within 2 seconds, more preferably within 1 second, and most preferably within 0.5 second is a suitable condition for cleavage of the radical polymerization initiator.

Due, in the present invention, to the heating of the reaction solution so that the radical polymerization initiator present in the timewise sliced volume of the reaction solution that has flowed into the heating-initiation part undergoes cleavage all at once, the radical polymerization reaction goes forward in unison; almost the entire amount of the monomer in the reaction solution is consumed by the polymerization reaction within a short period of time; and as a result almost the entire amount of the monomer in the timewise sliced reaction solution volume undergoes cleavage simultaneously and the polymerization reaction is simultaneously initiated and advanced.

Through a judicious setting of the reaction temperature, the polymerization reaction advances during transit through the heating-reaction part 60, and, depending on the reaction temperature and the flow rate of the reaction solution, transit through the heating-reaction part 60 may be finished prior to the reaction being completely finished. Or, depending on the reaction temperature and the flow rate of the reaction solution, the polymerization reaction may be completed and depolymerization of the polymer may subsequently proceed. In either case, the polymerization conversion is lower than the polymerization conversion at the completion of the polymerization reaction. The polymerization conversion can be adjusted as appropriate by controlling the reaction temperature and the reaction solution flow rate, and also by selecting the composition of the reaction solution (monomer concentration, type of polymerization initiator).

The reaction mixture flow after passage through the heating-reaction part 60 is cooled at the cooling part 70 and the polymerization reaction mixture can be taken off. The purpose of the cooling at the cooling part 70 is to bring the polymerization reaction mixture to the temperature for its removal, and cooling by a method in which merging is effected with a cooling medium flow, as for polymerization apparatus A, can also be adopted.

<Monomer>

The monomer polymerizable in the present invention may be any monomer that has an unsaturated bond capable of undergoing polymerization by radical polymerization. The target monomer can be exemplified by acrylic acid, acrylamide, N-isopropylacrylamide, vinylpyrrolidone, styrene, methyl methacrylate, hydroxyethyl methacrylate, acrylonitrile, ethylene, propylene, and vinyl chloride. However, this does not mean that monomer polymerizable through the application of the present invention is limited to these substances provided as examples.

<Initiator>

The polymerization initiator used by the present invention may be any substance that can undergo cleavage and thereby generate a free radical. The initiator can be exemplified by peroxides such as potassium persulfate, aqueous hydrogen peroxide, and benzoyl peroxide and by azo compounds such as azobisisobutyronitrile. Redox initiators may also be used as necessary. However, this does not mean that initiator usable by the present invention is limited to these substances provided as examples.

<Reaction Solution>

The reaction solution has a single monomer or two or more monomers, a single polymerization initiator or two or more polymerization initiators, and optionally a solvent. The solvent can be selected as appropriate from substances that dissolve or disperse the monomer and polymerization initiator. The solvent can typically be water or an organic solvent, and the organic solvent can be exemplified by hydrocarbons such as cyclohexane, alcohols such as ethanol, and aromatic compounds such as toluene. In addition, the solvent can also be a mixture of water with a water-soluble or water-compatible solvent (for example, a lower alcohol such as methanol or ethanol) or can be an emulsion of water and a hydrophobic organic solvent. A dispersing agent can also be present in the case of an emulsion. The monomer concentration in the reaction solution can be established as appropriate depending on the type of monomer and the type of solvent, and can be, for example, in the range of 0.01 to 30 wt %. The concentration of the polymerization initiator in the reaction solution can be established as appropriate depending on the type and concentration of the monomer, but can be, for example, in the range of 0.01 to 5 mass parts with reference to the unit amount (100 mass parts) of the monomer. However, these numerical value ranges are examples, and polymer having a desired molecular weight distribution can be produced, depending on the type of monomer and initiator or the reaction conditions, even at conditions outside the ranges given as examples.

The same substance as the solvent used in the reaction solution can be used for the heating medium that is merged and mixed with the reaction solution in the heating medium-reaction solution mixing part 20. However, depending on the type of reaction and the conditions, a substance different from the solvent used in the reaction solution can also be used. The temperature during merging of the heating medium with the reaction solution can be established as appropriate depending on the flow rates per unit time of the heating medium and reaction solution, the temperature established for the reaction, and the type of monomer and initiator. When the reaction temperature is to be 200° C., the reaction temperature can be brought to 200° C. by using 200° C. for the heating temperature for the heating medium in the heating medium heating part 12, merging with the reaction solution residing at room temperature, and heating the heating medium-reaction solution mixing part 20 and the reaction residence part 23 as necessary. Each temperature can be controlled considering the temperatures and flow rates of the heating medium and reaction solution, the heat generated by the polymerization reaction, and the heating and/or temperature maintenance conditions at the heating medium-reaction solution mixing part 20 and the reaction residence part 23.

<Reaction Conditions>

The reaction temperature and reaction pressure are established as appropriate depending on the reactivity of the monomer and initiator used. In order to obtain polymer having a relatively uniform molecular weight (narrow width for the average molecular weight), the heating for the polymerization reaction is carried out under the condition where the radical polymerization initiator present in the reaction solution undergoes cleavage all at once. When the temperature is too low, the polymerization reaction does not reach completion in a short period of time and the molecular weight becomes broad; when the temperature is too high, the produced polymer undergoes depolymerization to the monomer. Given these considerations, the reaction temperature (heating temperature) used by the present invention is established considering the type of radical polymerization initiator. For example, letting T° C. be the initiation temperature of the radical polymerization initiator, the reaction temperature can be in the range of T+50° C. to T+150° C. The initiation temperature T is approximately 70° C. when the radical polymerization initiator is potassium persulfate, and the reaction temperature is then in the range of 120° C. to 220° C. (T+50° C. to T+150° C.) and preferably in the range of 150° C. to 200° C. (T+80° C. to T+130° C.). For the relationship with the boiling point of the solvent used, the reaction temperature is preferably from at least the boiling point of the solvent to not more than 250° C. and is more desirably not more than 200° C. When water is used as the solvent, the reaction is preferably run at a temperature of at least 150° C. and not more than 200° C. The reaction temperature here refers to the temperature at the mixing-reaction part 22 of the polymerization apparatus. Viewed from the standpoint of control of the reaction, the temperature at the reaction residence part 23 favorably is equal to the temperature at the mixing-reaction part 22, or the outlet temperature of the reaction residence part 23 is within ±30° C. of the temperature at the reaction residence part 23.

The pressure at which the reaction is run should be equal to or greater than the vapor pressure of the solvent at the reaction temperature. When the polymerization apparatus A of the present invention is used, the reaction temperature and reaction pressure denote the temperature and pressure at the mixing-reaction part 22 and reaction residence part 23 within the heating medium-reaction solution mixing part 20. In the apparatus used in the examples, the temperature at the mixing-reaction part 22 and the temperature in the flow path D for the outlet from the reaction residence part 23 were measured.

The reaction mixture outflowing from the reaction residence part 23 is quenched at the coolant-reaction mixture mixing part 32 by merging and mixing with the cooling medium fed from the cooling medium storage and feed part 31 and is cooled to approximately room temperature as mixing progresses during transit through the cooling residence part 33. The same substance as the solvent used in the reaction solution can be used as the cooling medium. However, a substance different from the solvent used in the reaction solution may also be used depending on the type and conditions of the reaction. The temperature of the cooling medium at the time of confluence with the reaction mixture can be established as appropriate depending on the flow rates per unit time of the cooling medium and the reaction mixture. For example, when the temperature of the cooling medium at the cooling medium storage and feed part 31 is made 20° C., and for the case of merging with a 180° C. reaction mixture, the temperature at the coolant-reaction mixture mixing part 32 can be brought into the range, for example, from 80° C. to 130° C. by appropriate variation of the mixing ratio with the reaction mixture. By additional cooling of the cooling residence part 33, the temperature of the reaction mixture can be brought to a temperature in the neighborhood of room temperature.

The reaction mixture that has passed through the cooling residence part 33 is recovered as appropriate, and the polymer present in the reaction mixture can be separated and recovered from the solvent by common methods. A polymer having a uniform molecular weight distribution as follows can be produced by the method using the polymerization apparatus A of the present invention. For example, the Mw/Mn can be not more than 3, preferably in the range from 1.5 to 3, or in the range from 2 to 3. However, this does not mean that there is a limitation to these ranges, which are strictly exemplary.

When the polymerization apparatus B of the present invention is used, the reaction temperature and reaction pressure denote the temperature and pressure at the heating-reaction part 60. In the apparatus used in the examples, measurements were made using the temperature sensor 606 at the heating-reaction part 600 shown in FIG. 8-2. The reaction mixture outflowing from the heating-reaction part 60 (600) is quenched at the cooling part 70 and is cooled to room temperature. The reaction mixture that has passed through the cooling part 70 is appropriately recovered, and the polymer present in the reaction mixture can be separated and recovered from the solvent by common methods.

A polymer having a uniform molecular weight distribution as follows can be produced by the method using the polymerization apparatus B of the present invention. For example, the Mw/Mn can be not more than 2.5, preferably in the range from 1.5 to 2.5. However, this does not mean that there is a limitation to these ranges, which are strictly exemplary.

EXAMPLES

The present invention is described in additional detail based on the examples provided below. However, the examples are illustrations of the present invention, and the present invention should not be construed as being limited to or by the examples.

The polymerization conversion is determined in the examples using the following formula.

$$\text{polymerization conversion}(\%) = \frac{\text{actually obtained product concentration}*}{\text{product concentration at 100\% conversion,}} \times 100 \quad [\text{Math. 1}]$$

as determined from charge amounts**

*actually obtained product concentration

The obtained product (aqueous polyacrylic acid solution, A (g)) is dried and the mass of the residue (B (g)) is measured.

$$\frac{B(g)}{A(g)} \times 100 = \text{product concentration}(\%) \quad [\text{Math. 2}]$$

**product concentration at 100% conversion, as determined from charge amounts

| acrylic acid/potassium persulfate aqueous solution | |
| --- | --- |
| acrylic acid | 10 g (10% vs water) |
| potassium persulfate | 0.1 g (0.1% vs water) |
| water | 100 g |

When the aqueous solution is flowed at the rate shown in FIG. 1-2, the ultimately discharged acrylic acid concentration is as follows.

$$\frac{0.25 \times (10 \text{ g} + 0.1 \text{ g})}{\{0.5 \times 100 \text{ g}\} + \{0.25 \times (10 \text{ g} + 0.1 \text{ g} + 100 \text{ g})\} + \{0.25 \times 100 \text{ g}\}} \times 100 = 2.46\% \quad [\text{Math. 3}]$$

Example 1: Radical Polymerization of Acrylic Acid (Basic Pattern)

Figure 4:
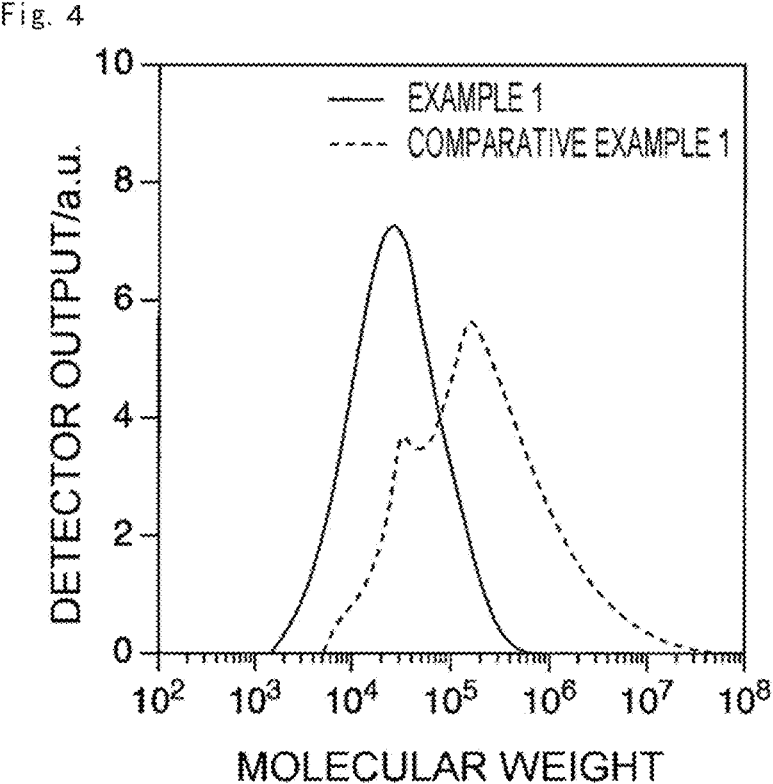
FIG. 4 shows a comparison of molecular weight distributions (Example 1, Comparative Example 1).
Figure 5:
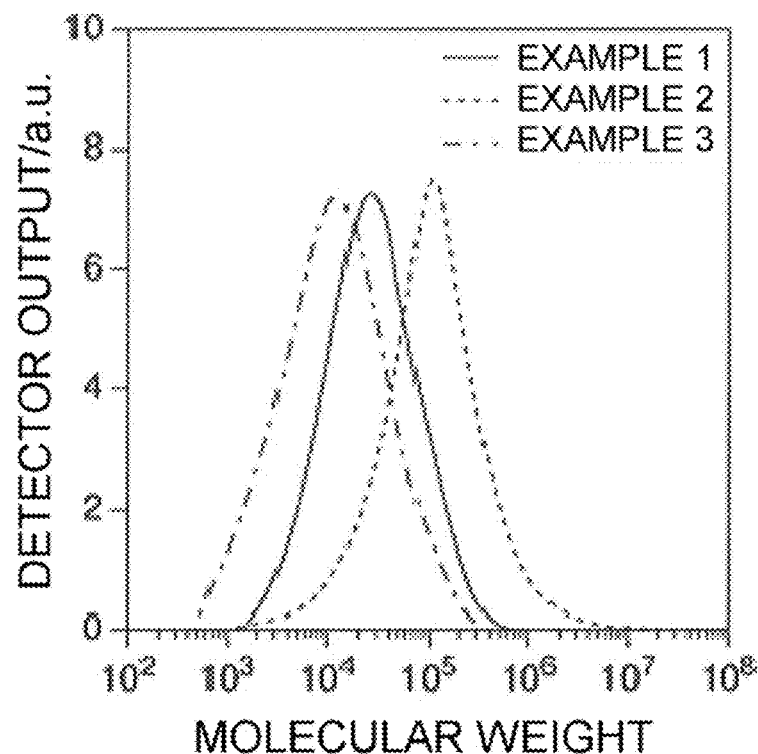
FIG. 5 shows the molecular weigh distributions of the polymers obtained in Examples 1, 2, and 3.

This was carried out using the polymerization apparatus shown in FIG. 1. An aqueous solution (20° C.) for reaction containing 10 weight % acrylic acid (Sigma-Aldrich Co. LLC.) and 0.1 weight % potassium persulfate (Sigma-Aldrich Co. LLC.) was mixed with hot water that had been preheated to 200° C. The flow rate of the aqueous reaction solution was 2.5 mL/min and the flow rate of the hot water was 5 mL/min. The reaction solution was mixed with 2.5 mL/min of cooling water (20° C.) and was cooled and recovered. The recovered reaction solution was evaporated to dryness; the polymerization conversion as measured by gravimetry was 60.3%. The residue was redissolved in water and was analyzed by size exclusion chromatography (instrument: Prominence GPC series, Shimadzu Corporation; detector: RID-10A differential refractometer, Shimadzu Corporation; column: TSKgel GMPW$_{XL}$, Tosoh Corporation). The results are given in FIGS. 4 and 5. The obtained molecular weights were a weight-average molecular weight (Mw) of 48,100 and a number-average molecular weight (Mn) of 19,300; the molecular weight distribution (Mw/Mn) was 2.49; and a polymer having a relatively uniform length was thus obtained.

Each flow path in the apparatus of FIG. 1 used in Example 1 is constructed of a 1/16-inch stainless steel (SUS316, inner diameter of approximately 0.8 mm) tube.

Example 2: Radical Polymerization of Acrylic Acid (Increase in Molecular Weight)

This was carried out using the polymerization apparatus shown in FIG. 1. An aqueous solution containing 30 weight % acrylic acid (Sigma-Aldrich Co. LLC.) and 0.01 weight % potassium persulfate (Sigma-Aldrich Co. LLC.) was mixed with hot water that had been preheated to 200° C. The recovered reaction solution was evaporated to dryness; the polymerization conversion as measured by gravimetry was 21.7%. The residue was redissolved in water and was analyzed by size exclusion chromatography (instrument: Prominence GPC series, Shimadzu Corporation; detector: RID-10A differential refractometer, Shimadzu Corporation; column: TSKgel GMPW$_{XL}$, Tosoh Corporation). The results are given in FIG. 5. The obtained molecular weights were a weight-average molecular weight (Mw) of 187,000 and a number-average molecular weight (Mn) of 53,000; the molecular weight distribution (Mw/Mn) was 3.53; and a polymer having a relatively uniform length was thus obtained.

(* In this example, the monomer concentration was increased 3× and the initiator concentration was decreased to 1/10 relative to that in the basic pattern given in Example 1.)

Example 3: Radical Polymerization of Acrylic Acid (Increase in the Polymerization Conversion)

This was carried out using the polymerization apparatus shown in FIG. 1. An aqueous solution containing 10 weight % acrylic acid (Sigma-Aldrich Co. LLC.) and 0.5 weight % potassium persulfate (Sigma-Aldrich Co. LLC.) was mixed with hot water that had been preheated to 200° C. The recovered reaction solution was evaporated to dryness; the polymerization conversion as measured by gravimetry was 85.8%. The residue was redissolved in water and was analyzed by size exclusion chromatography (instrument: Prominence GPC series, Shimadzu Corporation; detector RID-10A differential refractometer, Shimadzu Corporation; column: TSKgel GMPW$_{XL}$, Tosoh Corporation). The results are given in FIG. 5. The obtained molecular weights were a weight-average molecular weight (Mw) of 27,700 and a number-average molecular weight (Mn) of 7,290; the molecular weight distribution (Mw/Mn) was 3.70; and a polymer having a relatively uniform length was thus obtained.

(* The initiator concentration was increased 5× relative to that in the basic pattern.)

Example 4 (Relationships Between Reaction Temperature and the Polymerization Conversion, Etc.)

Figure 6:
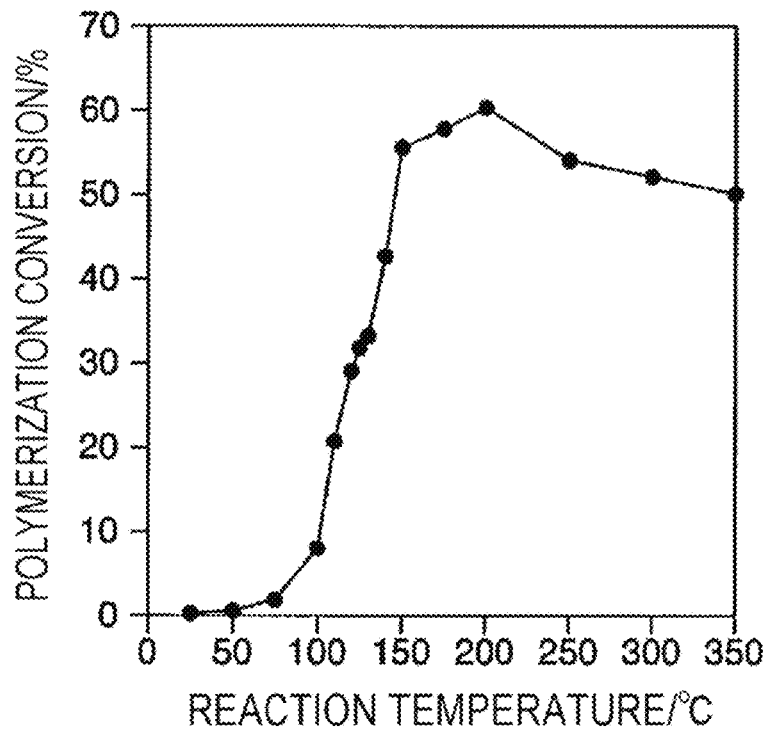
FIG. 6 shows the relationship obtained in Example 4 between the reaction temperature and the polymerization conversion.
Figure 7:
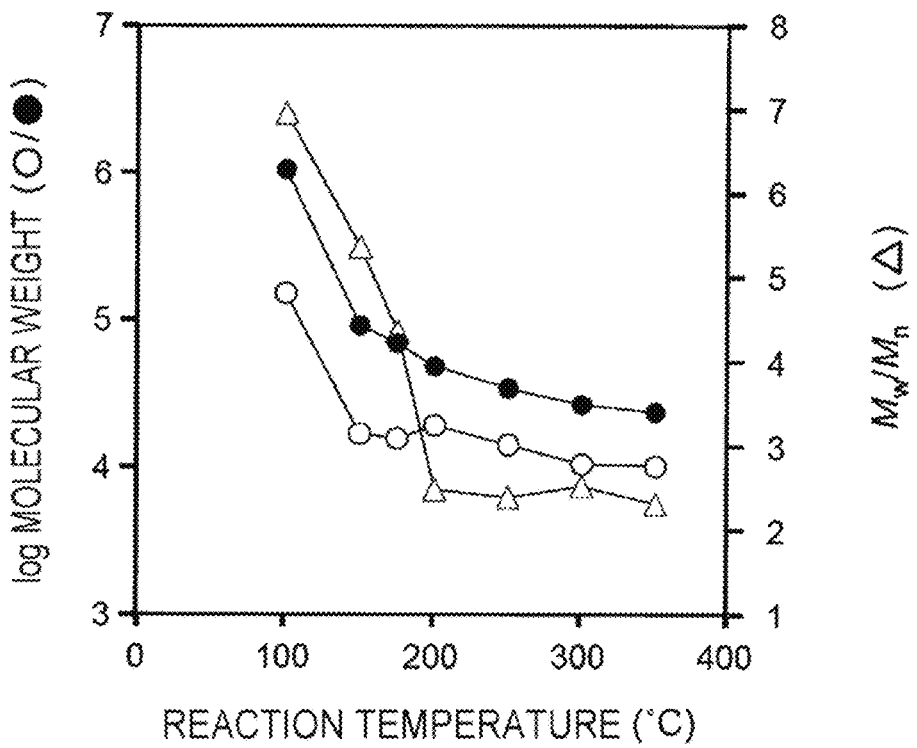
FIG. 7 shows the relationship obtained in Example 4 between the reaction temperature and the molecular weight and Mw/Mn.

Polymerization was run under the same conditions as in Example 1, but changing the reaction temperature (the temperature of the preheated water), and the polymerization conversion was determined for the obtained polymers. The results are given in FIG. 6. In addition, the relationships between the reaction temperature and the molecular weight and Mw/Mn are given in FIG. 7. The results shown in FIG. 6 demonstrate that, for the conditions given in Example 1, the polymerization is advanced at temperatures of about 100° C. and above, while an approximately constant conversion is obtained at temperatures of about 150° C. and above. The results given in FIG. 7 demonstrate that Mw/Mn becomes approximately constant at temperatures of 200° C. and above.

Comparative Example 1: Radical Polymerization of Acrylic Acid (Comparison With Batch Method)

An aqueous solution containing 10 weight % acrylic acid (Sigma-Aldrich Co. LLC.) and 0.1 weight % potassium persulfate (Sigma-Aldrich Co. LLC.) was heated for 24 hours using a 70° C. hot water bath. The recovered reaction solution was evaporated to dryness; the polymerization conversion as measured by gravimetry was 97.2%. The residue was redissolved in water and was analyzed by size exclusion chromatography (instrument: Prominence GPC series, Shimadzu Corporation; detector: RID-10A differential refractometer, Shimadzu Corporation; column: TSKgel GMPW$_{XL}$, Tosoh Corporation). The results are given in FIG. 4. The obtained molecular weights were a weight-average molecular weight (Mw) of 482,600 and a number-average molecular weight (Mn) of 67,600; the molecular weight distribution (Mw/Mn) was 7.14; and the molecular length was thus not uniform.

Reference Example 1: Radical Polymerization of Acrylic Acid (Case in which the Polymerization Temperature is Too Low)

This was carried out using the polymerization apparatus shown in FIG. 1. An aqueous solution containing 10 weight % acrylic acid (Sigma-Aldrich Co. LLC.) and 0.1 weight % potassium persulfate (Sigma-Aldrich Co. LLC.) was mixed with hot water that had been preheated to 100° C. The recovered reaction solution was evaporated to dryness: the polymerization conversion as measured by gravimetry was 8.0% and the polymerization had thus not advanced when the reaction temperature was low. The residue was redissolved in water and was analyzed by size exclusion chromatography (instrument: Prominence GPC series, Shimadzu Corporation; detector: RID-10A differential refractometer, Shimadzu Corporation; column: TSKgel GMPW$_{XL}$, Tosoh Corporation), and the obtained molecular weights were a weight-average molecular weight (Mw) of 1,042,000 and a number-average molecular weight (Mn) of 150,000 and the molecular weight distribution (Mw/Mn) was 6.95.

Example 5: Radical Polymerization of Acrylamide (Other Monomer 1)

This was carried out using the polymerization apparatus shown in FIG. 1. An aqueous solution containing 10 weight % acrylamide (Wako Pure Chemical Industries, Ltd.) and 0.1 weight % potassium persulfate (Sigma-Aldrich Co. LLC.) was mixed with hot water that had been preheated to 200° C. The recovered reaction solution was evaporated to dryness; the polymerization conversion as measured by gravimetry was 54.1%. The residue was redissolved in water and was analyzed by size exclusion chromatography (instrument: Prominence GPC series, Shimadzu Corporation; detector RID-10A differential refractometer, Shimadzu Corporation; column: TSKgel GMPW$_{XL}$, Tosoh Corporation): the obtained molecular weights were a weight-average molecular weight (Mw) of 39,600 and a number-average molecular weight (Mn) of 11,000; the molecular weight distribution (Mw/Mn) was 3.60; and a polymer having a relatively uniform length was thus obtained.

Example 6: Radical Polymerization of Methacrylic Acid (Other Monomer 2)

This was carried out using the polymerization apparatus shown in FIG. 1. An aqueous solution containing 10 weight % methacrylic acid (Wako Pure Chemical Industries, Ltd.) and 0.1 weight % potassium persulfate (Sigma-Aldrich Co. LLC.) was mixed with hot water that had been preheated to 200° C. The recovered reaction solution was evaporated to dryness; the polymerization conversion as measured by gravimetry was 10.4%. The residue was redissolved in water and was analyzed by size exclusion chromatography (instrument: Prominence GPC series, Shimadzu Corporation; detector: RID-10A differential refractometer, Shimadzu Corporation; column: TSKgel GMPW$_{XL}$, Tosoh Corporation): the obtained molecular weights were a weight-average molecular weight (Mw) of 22,500 and a number-average molecular weight (Mn) of 9,040; the molecular weight distribution (Mw/Mn) was 2.49; and a polymer having a relatively uniform length was thus obtained.

Example 7: Radical Polymerization of Acrylic Acid (Synthesis of Polymer of Uniform Molecular Weight)

This was carried out using the polymerization apparatus B shown in FIG. 8-1. The heating-reaction part of this polymerization apparatus B is the apparatus shown in FIG. 8-2. The apparatus shown in FIG. 8-2 is as described above. The tube 601 is a 1/16-inch stainless steel (SUS316, inner diameter of approximately 0.8 mm) tube and has a length of 3 m. The tube in the cooling part is the same 1/16-inch stainless steel tube.

Figure 9:
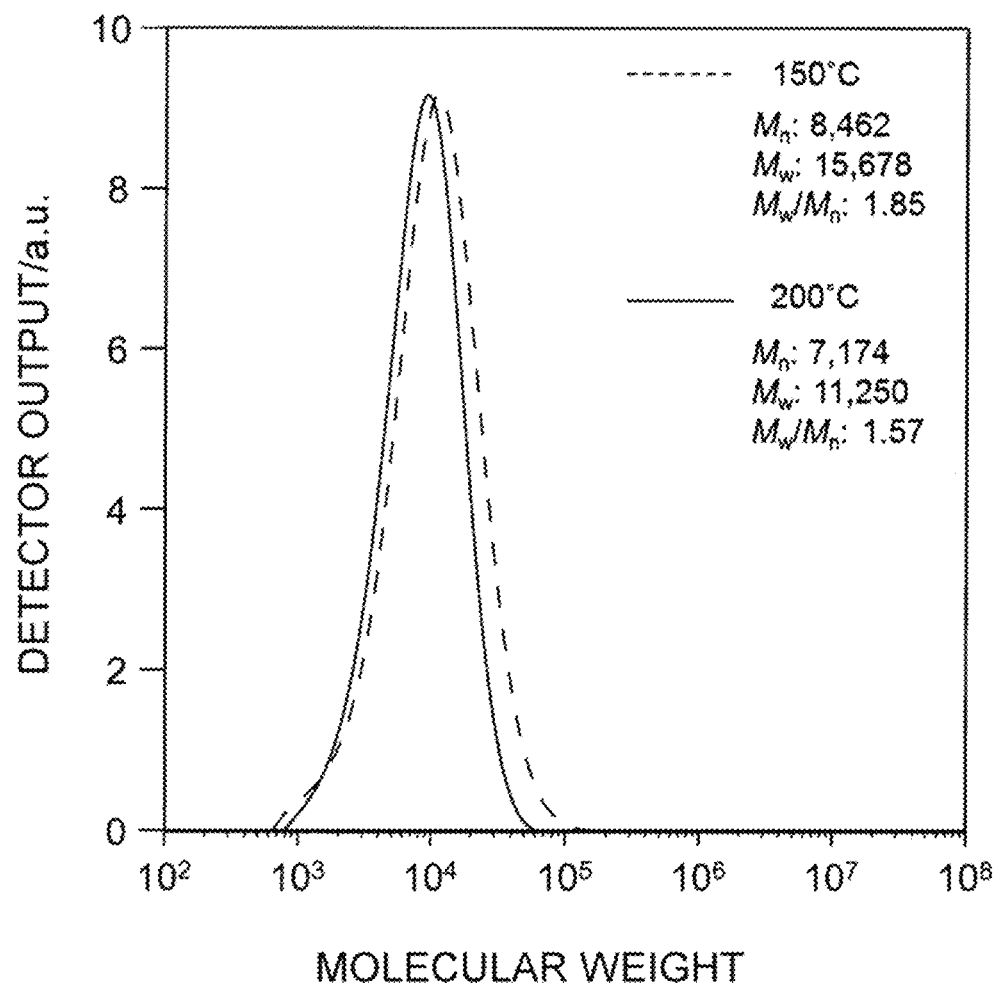
FIG. 9 shows the molecular weight distribution (150° C. and 200° C.) of the polymer obtained in Example 7.

An aqueous solution (20° C.) containing 3.3 weight % acrylic acid (Sigma-Aldrich Co. LLC.) and 0.2 weight % potassium persulfate (Sigma-Aldrich Co. LLC., initiation temperature: 70° C.) was flowed through the heating-reaction part apparatus 600 shown in FIG. 8-2 that had been preheated to 150° C. or 200° C. The flow rate of the aqueous reaction solution was 10 mL/min. Here, this 10 mL/min corresponds to 0.167 mL/sec, 35.7 cm/sec, and a residence time in the 3-meter tube of 8.4 seconds. The reaction solution outflowing from the heating-reaction part apparatus was instantaneously cooled to room temperature by passing the reaction solution through a portion of the outlet side extension of the tube 601 that was immersed in a cooling water tank, and was then recovered. The recovered reaction solution was evaporated to dryness to recover the polymer. The polymerization conversion determined by gravimetry is given in Table 1. The residue (polymer) was redissolved in water and was analyzed by size exclusion chromatography (instrument: Prominence GPC series, Shimadzu Corporation; detector: RID-10A differential refractometer, Shimadzu Corporation; column: TSKgel GMPWXL, Tosoh Corporation). The results are given in Table 1 and FIG. 9. A polymer of uniform length (narrow molecular weight distribution) was obtained in both cases.

TABLE 1

|  | polymerization reaction temperature | |
| --- | --- | --- |
|  | 150° C. | 200° C. |
| polymerization conversion | 87% | 48.6% |
| weight-average molecular weight (Mw) | 15920 | 11300 |
| number-average molecular weight (Mn) | 7060 | 7170 |
| molecular weight distribution (Mw/Mn) | 2.25 | 1.57 |

Example 8: Radical Polymerization of Acrylic Acid (Effect of Flow Rate)

Figure 10:
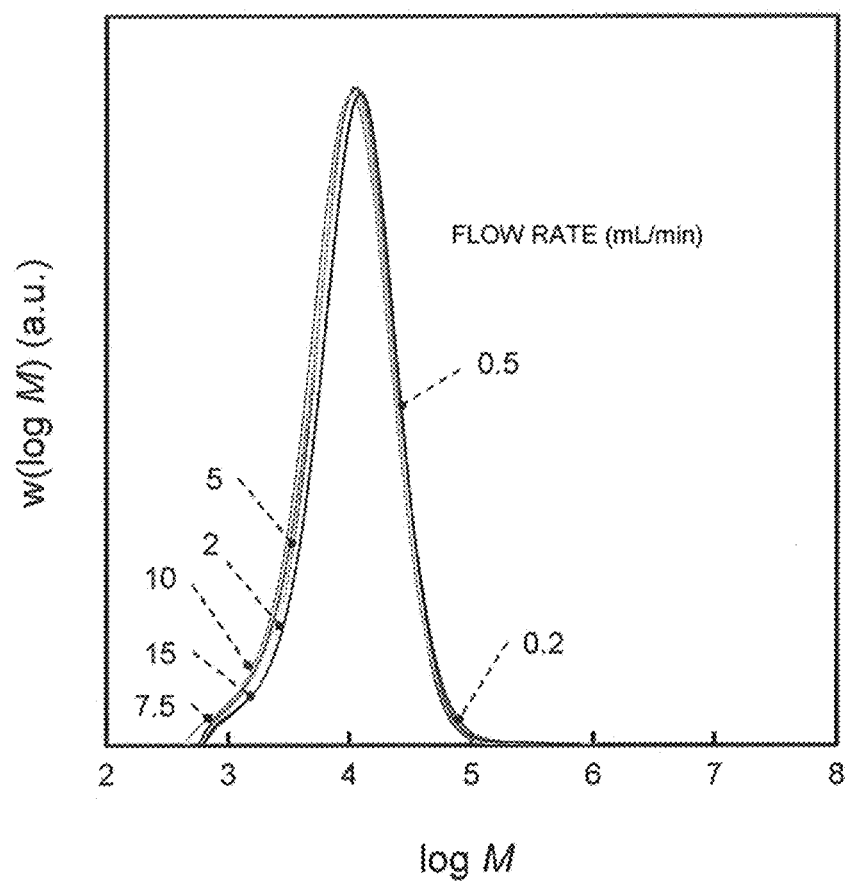
FIG. 10 shows the relationship obtained in Example 8 at a reaction temperature of 150° C. between the flow rate of the reaction solution and the molecular weight distribution of the polymer.
Figure 11:
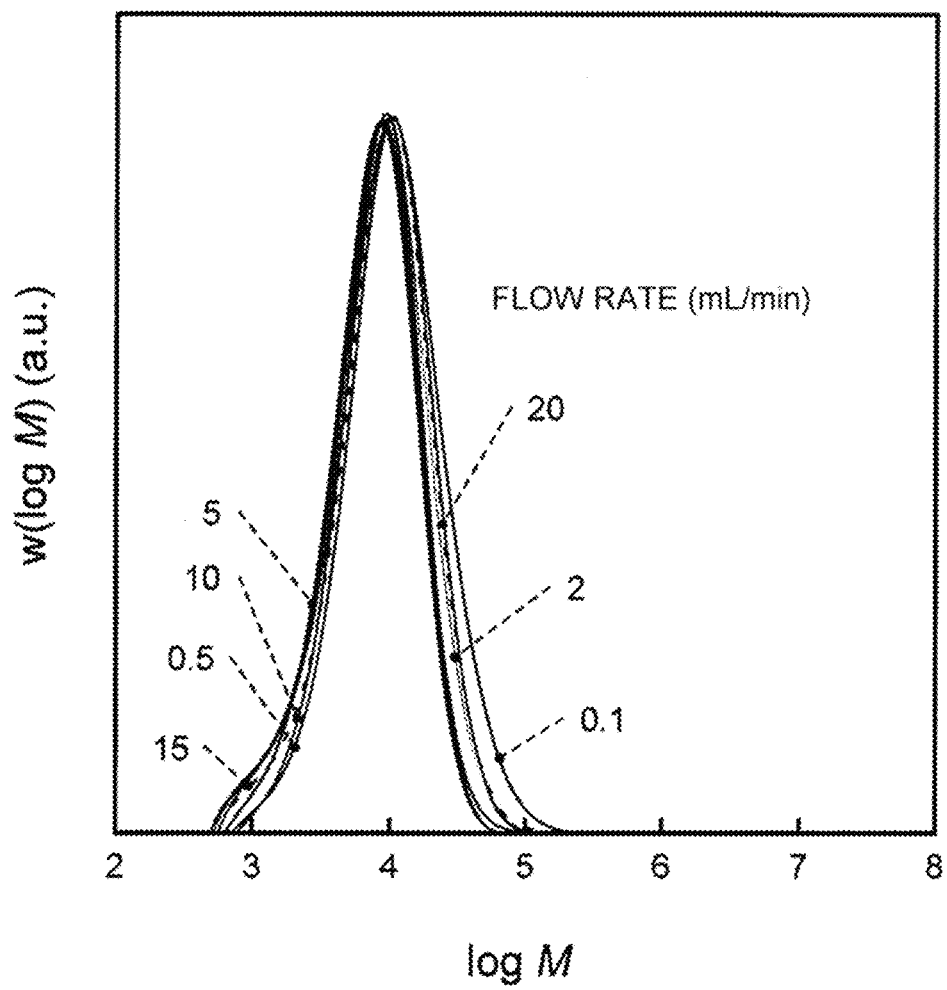
FIG. 11 shows the relationship obtained in Example 8 at a reaction temperature of 200° C. between the flow rate of the reaction solution and the molecular weight distribution of the polymer.

Using a polymerization reaction temperature of 150° C. or 200° C., polymer was obtained under the same conditions as in Example 7, but changing the flow rate of the aqueous reaction solution from 10 mL/min, and the molecular weight and molecular weight distribution were determined. The results are given in FIG. 10 (150° C.) and FIG. 11 (200° C.). It is shown that the molecular weight and molecular weight distribution vary with the flow rate of the aqueous reaction solution and that there is, depending on the reaction temperature, a flow rate for the aqueous reaction solution that presents the minimum molecular weight distribution. With regard to the flow rate, for example, 0.1 mL/min is 0.36 cm/sec (residence time in the 3-meter tube: 840 seconds); 1 mL/min is 3.6 cm/sec (residence time in the 3-meter tube: 84 seconds); and 20 mL/min is 71.4 cm/sec (residence time in the 3-meter tube: 4.2 seconds).

Example 9: Radical Polymerization of Acrylic Acid (Raising the Conversion)

This was carried out using the polymerization apparatus B shown in FIG. 8-1. The heating-reaction part of this polymerization apparatus B is the apparatus shown in FIG. 8-2. An aqueous solution (20° C.) for reaction containing 10 weight % acrylic acid (Sigma-Aldrich Co. LLC.) and 0.5 weight % potassium persulfate (Sigma-Aldrich Co. LLC., initiation temperature: 70° C.) was flowed through the heating-reaction part apparatus that had been preheated to 150° C. The flow rate of the aqueous reaction solution was 2 mL/min. The reaction solution was cooled with a cooling tank and was recovered. The recovered reaction solution was evaporated to dryness; the polymerization conversion as measured by gravimetry was 89.6%. The residue was redissolved in water and was analyzed by size exclusion chromatography (instrument: Prominence GPC series, Shimadzu Corporation; detector: RID-10A differential refractometer, Shimadzu Corporation; column: TSKgel GMPWXL, Tosoh Corporation). The results are given in FIGS. 4 and 5. The obtained molecular weights were a weight-average molecular weight (Mw) of 40,000 and a number-average molecular weight (Mn) of 10,020; the molecular weight distribution (Mw/Mn) was 4.00; and a polymer having a relatively uniform length was thus obtained.

Example 10: Radical Polymerization of Acrylic Acid (Relationship Between Reaction Temperature and Polymerization Conversion)

Figure 12:
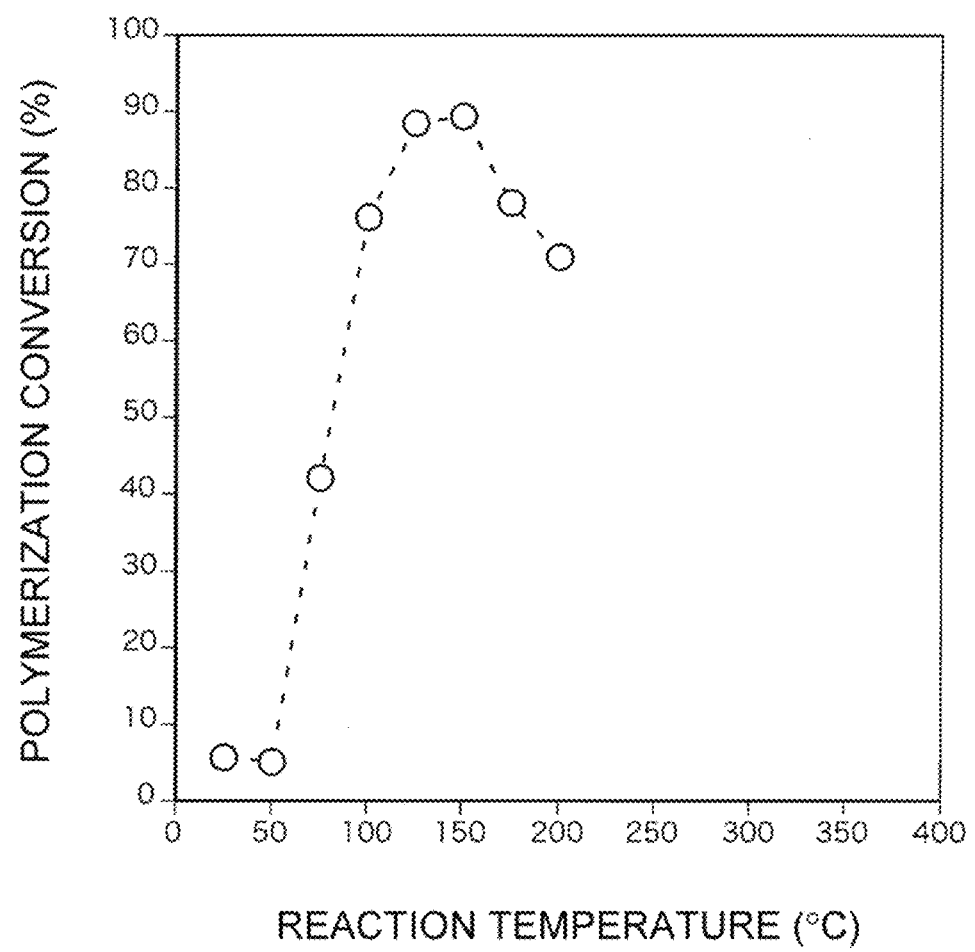
FIG. 12 shows the relationship obtained in Example 10 between the reaction temperature and the polymerization conversion.

Polymer was recovered under the same conditions as in Example 9, but varying the polymerization reaction temperature between 50° C. and 200° C. and varying the flow rate of the aqueous solution between 0.2 mL/min and 15 mL/min. The polymerization conversion measured by gravimetry is shown in FIG. 12.

Example 11: Radical Polymerization of Acrylic Acid (Relationship Between Conversion and Residence Time)

Polymer was recovered under the same conditions as in Example 9, but using 150° C., 200° C., or 250° C. for the heating temperature at the heating-reaction part apparatus, wherein the flow rate was varied between 0.2 mL/min and 15 mL/min at the heating temperature of 150° C.; the flow rate was varied between 0.1 mL/min and 20 mL/min at the heating temperature of 200° C.; and the flow rate was varied between 0.2 mL/min and 10 mL/min at the heating temperature of 250° C. The polymerization conversion measured by gravimetry is shown in FIG. 13.

Figure 13:
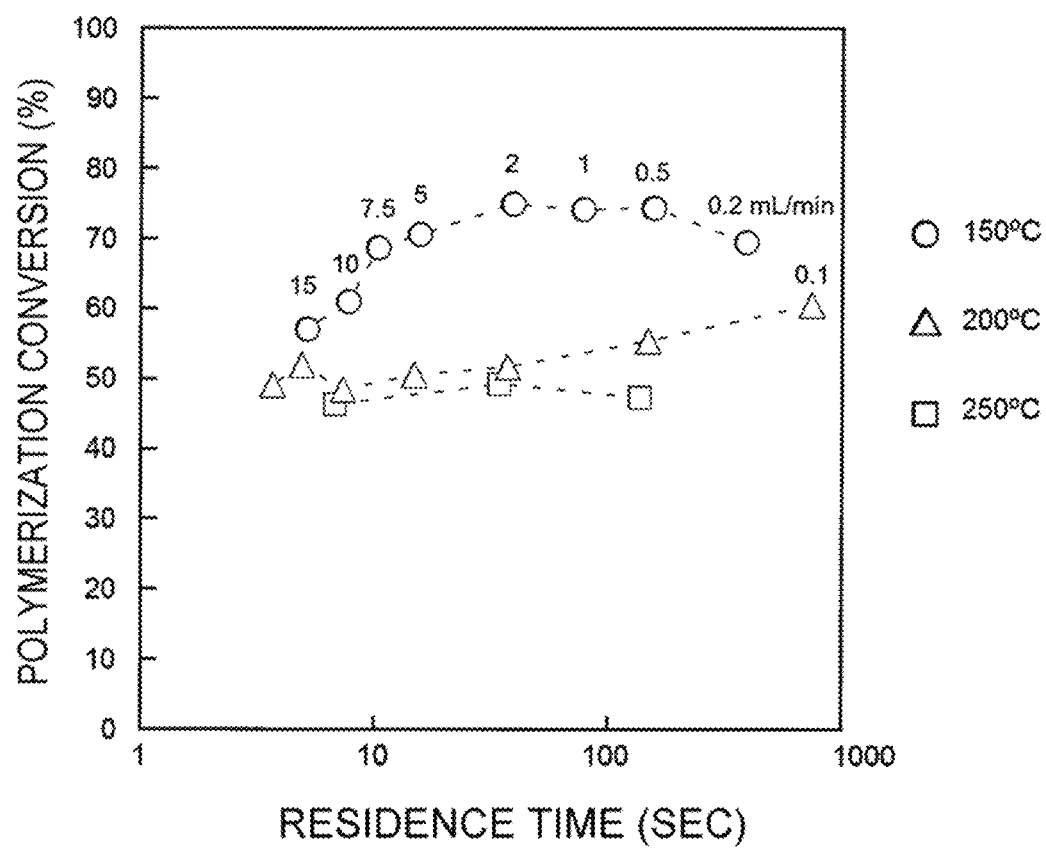
FIG. 13 shows the relationship obtained in Example 11 between the residence time in the heating-reaction part and the polymerization conversion.

The results in FIG. 13 demonstrate the following: at a reaction temperature of 150° C., the conversion undergoes a relatively large change due to the residence time at the heating-reaction part apparatus (change due to the flow rate of the aqueous reaction solution); at the reaction temperatures of 200° C. and 250° C., the conversion undergoes a relatively small change due to the residence time at the heating-reaction part apparatus (change due to the flow rate of the aqueous reaction solution). This shows that in the case of the reaction temperatures of 200° C. and 250° C., the polymerization reaction is almost entirely completed at the initial stage (within 10 seconds) of inflow to the heating-reaction part apparatus, while for the reaction temperature of 150° C., in contrast the polymerization reaction advances even between 10 seconds and 100 seconds after inflow to the heating-reaction part apparatus.

INDUSTRIAL APPLICABILITY

The present invention is useful in fields associated with radical polymerization.

The present invention is expected to be broadly used for the synthesis of high molecular weight polymers by radical polymerization.

REFERENCE SIGNS LIST

10 Heating medium production part
11 Heating medium starting material storage part
12 Heating medium heating part
20 Heating medium-reaction solution mixing part
21 Reaction solution storage and feed part
22 Mixing-reaction part
23 Reaction residence part
30 Cooling part
31 Cooling medium storage and feed part
32 Coolant-reaction mixture mixing part
33 Cooling residence part
40 Reaction mixture recovery part
60 Heating-reaction part
61 Flow path
62 Heating part
70 Cooling part
71 Flow path
80 Reaction mixture recovery part
81 Pressure reduction valve

The invention claimed is:

1. A method of producing a polymer by causing a reaction solution containing a monomer and a radical polymerization initiator to continuously or intermittently flow through a flow path of a radical polymerization reaction apparatus, the method comprising:
   (1) a step of flowing the reaction solution into a heating-initiation part of the reaction apparatus and heating the flowed reaction solution to a prescribed temperature to cause the radical polymerization initiator in the reaction solution that has flowed into the heating-initiation part to undergo cleavage and thereby initiate radical polymerization of the monomer;
   (2) a step of advancing the radical polymerization of the monomer in the reaction solution; and
   (3) a step of cooling the reaction solution and obtaining the polymer,
   wherein the heating of the reaction solution, which has flowed into the heating-initiation part, to the prescribed temperature in step (1) is carried out by continuously mixing, under pressurization, the reaction solution with a heating medium to form a reaction solution/heating medium mixture in the heating-initiation part.

2. The method according to claim 1, wherein the reaction solution contains water; the heating medium is water heated to at least 150° C.; and the reaction solution and the heating medium are continuously mixed at a flow rate ratio that provides a temperature of at least 100° C. immediately after mixing.

3. The method according to claim 1, wherein the reaction solution contains an organic solvent; the heating medium is an organic solvent heated to at least its boiling point; and the reaction solution and the heating medium are continuously mixed at a flow rate ratio that provides a temperature that is at least the boiling point of the organic solvent immediately after mixing.

4. The method according to claim 1, wherein the heating is carried out under a condition where cleavage of the radical polymerization initiator present in a unit volume of the reaction solution is completed within 1 second.

5. The method according to claim 1, wherein the prescribed temperature for said heating is in the range of T+50° C. to T+150° C. where T° C. is an initiation temperature of the radical polymerization initiator.

6. The method according to claim 1, wherein the polymer has a ratio of weight-average molecular weight (Mw)/number-average molecular weight (Mn) of not more than 3.0.

7. The method according to claim 1, wherein the polymer has a ratio of weight-average molecular weight (Mw)/number-average molecular weight (Mn) of not more than 2.0.

8. A radical polymerization reaction apparatus configured to carry out the method of claim 1 comprising:
   (1) a heating medium production part including a heating medium heating part;
   (2) a heating medium-reaction solution mixing part including a reaction solution storage and feed part, mixing reaction part, and a reaction residence part, wherein the heating medium heating part merges with the reaction solution storage and feed part at the mixing reaction to form a merged flow path that connects to the reaction residence part; and
   (3) a cooling part connected to the reaction part by a flow path; and a reaction mixture recovery part connected to the cooling part by a flow path.

9. The apparatus according to claim 8, wherein
   (1) the heating medium production part includes a heating medium starting material storage part connected to the heating medium heating part;
   (2) the cooling part includes a cooling medium storage and feed part, a coolant-reaction mixture mixing part, and a cooling residence part.

10. The apparatus according to claim 9, wherein, in the heating medium production part,
   the heating medium starting material storage part is configured to store a heating medium starting material and feed the heating medium starting material to the heating medium heating part, and
   the heating medium heating part comprises a flow path through which the heating medium starting material flows, and a heating apparatus that heats this flow path.

11. The apparatus according to claim 9, wherein, in the heating medium-reaction solution mixing part,
   the reaction solution storage and feed part is configured to store a reaction solution and feed the reaction solution to the mixing-reaction part, and
   the mixing-reaction part is configured to merge and mix a heating medium flow fed via a flow path from the heating medium heating part, with a reaction solution flow fed via a flow path from the reaction solution storage and feed part, and has a structure in which a flow path forms three branches.

12. The apparatus according to claim 9, wherein, in the cooling part 30,
   the cooling medium storage and feed part is configured to store a cooling medium and feed the cooling medium to the cooling medium-reaction mixture mixing part,
   the cooling medium-reaction mixture mixing part is configured to merge and mix a reaction mixture flow fed via a flow path from the reaction residence part, with a cooling medium flow fed via a flow path from the cooling medium storage and feed part, and
   the cooling residence part is configured to hold a temperature hold or cool.

13. The method according to claim 1, wherein the reaction solution contains water; the heating medium is water heated to at least 150° C.; and the reaction solution and the heating medium are continuously mixed at a flow rate ratio that provides a temperature of at least 100° C. immediately after mixing.

14. The method according to claim 1, wherein the reaction solution contains an organic solvent; the heating medium is an organic solvent heated to at least its boiling point; and the reaction solution and the heating medium are continuously mixed at a flow rate ratio that provides a temperature that is at least the boiling point of the organic solvent immediately after mixing.

15. The method according to claim 1, wherein the prescribed temperature for said heating is in the range of T+50° C. to T+150° C. where T° C. is an initiation temperature of the radical polymerization initiator.

16. The method according to claim 1, wherein the polymer has a ratio of weight-average molecular weight (Mw)/number-average molecular weight (Mn) of not more than 3.0.

17. The apparatus according to claim 10, wherein, in the heating medium-reaction solution mixing part,
the reaction solution storage and feed part is configured to store a reaction solution and feed the reaction solution to the mixing-reaction part, and
the mixing-reaction part is configured to merge and mix a heating medium flow fed via a flow path from the heating medium heating part, with a reaction solution flow fed via a flow path from the reaction solution storage and feed part, and has a structure in which a flow path forms three branches.

18. The apparatus according to claim 10, wherein, in the cooling part,
the cooling medium storage and feed part is configured to store a cooling medium and feed the cooling medium to the cooling medium-reaction mixture mixing part,
the cooling medium-reaction mixture mixing part is configured to merge and mix a reaction mixture flow fed via a flow path from the reaction residence part, with a cooling medium flow fed via a flow path from the cooling medium storage and feed part, and
the cooling residence part is configured to hold a temperature or cool.

19. The apparatus according to claim 11, wherein, in the cooling part,
the cooling medium storage and feed part is configured to store a cooling medium and feed the cooling medium to the cooling medium-reaction mixture mixing part,
the cooling medium-reaction mixture mixing part is configured to merge and mix a reaction mixture flow fed via a flow path from the reaction residence part, with a cooling medium flow fed via a flow path from the cooling medium storage and feed part, and
the cooling residence part is configured to hold a temperature hold or cool.

20. The method according to claim 1, wherein the heating is carried out under a condition where cleavage of the radical polymerization initiator present in a unit volume of the reaction solution is completed within 5 seconds.

21. The apparatus according to claim 8, wherein the heating medium production part and the merged flow path communicate linearly, and the reaction solution storage and feed part merges therein at an angle in a range of at least 10° to 170°.

22. The apparatus according to claim 8, wherein the reaction solution storage and feed part and the merged flow path communicate linearly, and the heating medium production part merges therein at an angle in a range of at least 10° to 170°.

* * * * *